(12) United States Patent
Tachino et al.

(10) Patent No.: US 7,065,030 B2
(45) Date of Patent: Jun. 20, 2006

(54) REPRODUCTION-ONLY RECORDING MEDIUM, REPRODUCTION DEVICE, REPRODUCTION METHOD

(75) Inventors: Ryuya Tachino, Kanagawa (JP); Susumu Senshu, Kanagawa (JP)

(73) Assignee: Sony Corporation, Tokyo (JP)

(*) Notice: Subject to any disclaimer, the term of this patent is extended or adjusted under 35 U.S.C. 154(b) by 209 days.

(21) Appl. No.: 10/494,588

(22) PCT Filed: Aug. 27, 2003

(86) PCT No.: PCT/JP03/10858

§ 371 (c)(1),
(2), (4) Date: May 5, 2004

(87) PCT Pub. No.: WO2004/023482

PCT Pub. Date: Mar. 18, 2004

(65) Prior Publication Data

US 2005/0002653 A1 Jan. 6, 2005

(30) Foreign Application Priority Data

Sep. 9, 2002 (JP) ............................. 2002-262490

(51) Int. Cl.
*G11B 20/12* (2006.01)

(52) U.S. Cl. ............................. 369/59.25; 369/47.22; 369/124.08

(58) Field of Classification Search ............... None
See application file for complete search history.

(56) References Cited

U.S. PATENT DOCUMENTS

| | | | | |
|---|---|---|---|---|
| 5,224,087 A | * | 6/1993 | Maeda et al. ............ | 369/53.12 |
| 5,563,861 A | * | 10/1996 | Kudo et al. ............... | 369/53.12 |
| 5,650,991 A | * | 7/1997 | Fujiie ....................... | 369/53.22 |
| 6,205,104 B1 | * | 3/2001 | Nagashima et al. ...... | 369/59.14 |
| 2003/0021210 A1 | * | 1/2003 | Schep ....................... | 369/59.25 |
| 2003/0103429 A1 | * | 6/2003 | Senshu ..................... | 369/59.25 |

FOREIGN PATENT DOCUMENTS

| | | |
|---|---|---|
| JP | 7-6515 | 1/1995 |
| JP | 8-235779 | 9/1996 |
| JP | 2001-250249 | 9/2001 |
| JP | 2002-50136 | 2/2002 |
| JP | 2002-83466 | 3/2002 |
| JP | 2002-117627 | 4/2002 |
| JP | 2002-197675 | 7/2002 |

\* cited by examiner

*Primary Examiner*—Thang V. Tran
(74) *Attorney, Agent, or Firm*—Oblon, Spivak, McClelland, Maier & Neustadt, P.C.

(57) ABSTRACT

A data-arranging method similar to that of a RAM disk is adopted for a ROM disk to make the ROM disk highly compatible with the RAM disk. According to this method, buffer areas are allocated as a data run-in and a data run-out respectively preceding and succeeding a RUB (Recording Unit Block) used as a recording/reproduction unit. In addition, at locations separated from each other in the buffer areas by a distance equal in length to a sync-data gap in successive frames in the RUB, pieces of sync data (SA) are provided so that the sync data always appears at equal intervals in a signal reproduced from the ROM disk, providing a feature advantageous to establishment and protection of synchronization. It is thus possible to implement a ROM disk that is highly compatible with the RAM disk and advantageous to a synchronization system.

6 Claims, 14 Drawing Sheets

FIG. 5A

| Sync number | 24-bit sync body ⌐ 9T ⌐ 9T ⌐ | 6-bit sync ID |
|---|---|---|
| FS0 | #01 010 000 000 010 000 000 010 | 000 001 |
| FS1 | #01 010 000 000 010 000 000 010 | 010 010 |
| FS2 | #01 010 000 000 010 000 000 010 | 101 000 |
| FS3 | #01 010 000 000 010 000 000 010 | 100 001 |
| FS4 | #01 010 000 000 010 000 000 010 | 000 100 |
| FS5 | #01 010 000 000 010 000 000 010 | 001 001 |
| FS6 | #01 010 000 000 010 000 000 010 | 010 000 |

FIG. 5B

| Frame number | Frame Sync | Frame number | Frame Sync |
|---|---|---|---|
| 0 | FS0 | | |
| 1 | FS1 | 16 | FS5 |
| 2 | FS2 | 17 | FS3 |
| 3 | FS3 | 18 | FS2 |
| 4 | FS3 | 19 | FS2 |
| 5 | FS1 | 20 | FS5 |
| 6 | FS4 | 21 | FS6 |
| 7 | FS1 | 22 | FS5 |
| 8 | FS5 | 23 | FS1 |
| 9 | FS5 | 24 | FS1 |
| 10 | FS4 | 25 | FS6 |
| 11 | FS3 | 26 | FS2 |
| 12 | FS4 | 27 | FS6 |
| 13 | FS6 | 28 | FS4 |
| 14 | FS6 | 29 | FS4 |
| 15 | FS3 | 30 | FS2 |

FIG. 6A

| Sync number | 24-bit sync body  9T   9T | 6-bit sync ID |
|---|---|---|
| FS0 | #01 010 000 000 010 000 000 010 | 000 001 |
| FS1 | #01 010 000 000 010 000 000 010 | 010 010 |
| FS2 | #01 010 000 000 010 000 000 010 | 101 000 |
| FS3 | #01 010 000 000 010 000 000 010 | 100 001 |
| FS4 | #01 010 000 000 010 000 000 010 | 000 100 |
| FS5 | #01 010 000 000 010 000 000 010 | 001 001 |
| FS6 | #01 010 000 000 010 000 000 010 | 010 000 |

FIG. 6B

| Frame number | Frame Sync | Frame number | Frame Sync |
|---|---|---|---|
| 0 | FS0 | | |
| 1 | FS1 | 16 | FS5 |
| 2 | FS2 | 17 | FS3 |
| 3 | FS3 | 18 | FS2 |
| 4 | FS3 | 19 | FS2 |
| 5 | FS1 | 20 | FS5 |
| 6 | FS4 | 21 | FS6 |
| 7 | FS1 | 22 | FS5 |
| 8 | FS5 | 23 | FS1 |
| 9 | FS5 | 24 | FS1 |
| 10 | FS4 | 25 | FS6 |
| 11 | FS3 | 26 | FS2 |
| 12 | FS4 | 27 | FS6 |
| 13 | FS6 | 28 | FS4 |
| 14 | FS6 | 29 | FS4 |
| 15 | FS3 | 30 | FS2 |

| LINKING S3 | FS0 |
|---|---|
| LINKING SA | ONE OF FS1 TO FS6 OR SYNC PATTERN WITHOUT SYNC ID |

FIG. 7A

| Sync number | 24-bit sync body 10T 10T | 6-bit sync ID |
|---|---|---|
| FS0 | #01 000 000 000 100 000 000 010 | 000 001 |
| FS1 | #01 000 000 000 100 000 000 010 | 010 010 |
| FS2 | #01 000 000 000 100 000 000 010 | 101 000 |
| FS3 | #01 000 000 000 100 000 000 010 | 100 001 |
| FS4 | #01 000 000 000 100 000 000 010 | 000 100 |
| FS5 | #01 000 000 000 100 000 000 010 | 001 001 |
| FS6 | #01 000 000 000 100 000 000 010 | 010 000 |

FIG. 7B

| Frame number | Frame Sync | Frame number | Frame Sync |
|---|---|---|---|
| 0 | FS0 | | |
| 1 | FS1 | 16 | FS5 |
| 2 | FS2 | 17 | FS3 |
| 3 | FS3 | 18 | FS2 |
| 4 | FS3 | 19 | FS2 |
| 5 | FS1 | 20 | FS5 |
| 6 | FS4 | 21 | FS6 |
| 7 | FS1 | 22 | FS5 |
| 8 | FS5 | 23 | FS1 |
| 9 | FS5 | 24 | FS1 |
| 10 | FS4 | 25 | FS6 |
| 11 | FS3 | 26 | FS2 |
| 12 | FS4 | 27 | FS6 |
| 13 | FS6 | 28 | FS4 |
| 14 | FS6 | 29 | FS4 |
| 15 | FS3 | 30 | FS2 |

| LINKING S3 | FS0 |
|---|---|
| LINKING SA | ONE OF FS1 TO FS6 OR SYNC PATTERN WITHOUT SYNC ID |

FIG. 8A

| Sync number | 24-bit sync body ⌐ 9T ⌐ 9T ⌐ | 6-bit sync ID |
|---|---|---|
| FS0 | #01 010 000 000 010 000 000 010 | 000 001 |
| FS1 | #01 010 000 000 010 000 000 010 | 010 010 |
| FS2 | #01 010 000 000 010 000 000 010 | 101 000 |
| FS3 | #01 010 000 000 010 000 000 010 | 100 001 |
| FS4 | #01 010 000 000 010 000 000 010 | 000 100 |
| FS5 | #01 010 000 000 010 000 000 010 | 001 001 |
| FS6 | #01 010 000 000 010 000 000 010 | 010 000 |
| FS7 | #01 010 000 000 010 000 000 010 | 010 101 |

FIG. 8B

| Frame number | Frame Sync | Frame number | Frame Sync |
|---|---|---|---|
| 0 | FS0 | | |
| 1 | FS1 | 16 | FS5 |
| 2 | FS2 | 17 | FS3 |
| 3 | FS3 | 18 | FS2 |
| 4 | FS3 | 19 | FS2 |
| 5 | FS1 | 20 | FS5 |
| 6 | FS4 | 21 | FS6 |
| 7 | FS1 | 22 | FS5 |
| 8 | FS5 | 23 | FS1 |
| 9 | FS5 | 24 | FS1 |
| 10 | FS4 | 25 | FS6 |
| 11 | FS3 | 26 | FS2 |
| 12 | FS4 | 27 | FS6 |
| 13 | FS6 | 28 | FS4 |
| 14 | FS6 | 29 | FS4 |
| 15 | FS3 | 30 | FS2 |

| LINKING S3 | FS0 |
|---|---|
| LINKING SA | FS7 |

FIG. 9A

| Sync number | 24-bit sync body  10T  10T | 6-bit sync ID |
|---|---|---|
| FS0 | #01 000 000 000 100 000 000 010 | 000 001 |
| FS1 | #01 000 000 000 100 000 000 010 | 010 010 |
| FS2 | #01 000 000 000 100 000 000 010 | 101 000 |
| FS3 | #01 000 000 000 100 000 000 010 | 100 001 |
| FS4 | #01 000 000 000 100 000 000 010 | 000 100 |
| FS5 | #01 000 000 000 100 000 000 010 | 001 001 |
| FS6 | #01 000 000 000 100 000 000 010 | 010 000 |
| FS7 | #01 000 000 000 100 000 000 010 | 010 101 |

FIG. 9B

| Frame number | Frame Sync | Frame number | Frame Sync |
|---|---|---|---|
| 0 | FS0 | | |
| 1 | FS1 | 16 | FS5 |
| 2 | FS2 | 17 | FS3 |
| 3 | FS3 | 18 | FS2 |
| 4 | FS3 | 19 | FS2 |
| 5 | FS1 | 20 | FS5 |
| 6 | FS4 | 21 | FS6 |
| 7 | FS1 | 22 | FS5 |
| 8 | FS5 | 23 | FS1 |
| 9 | FS5 | 24 | FS1 |
| 10 | FS4 | 25 | FS6 |
| 11 | FS3 | 26 | FS2 |
| 12 | FS4 | 27 | FS6 |
| 13 | FS6 | 28 | FS4 |
| 14 | FS6 | 29 | FS4 |
| 15 | FS3 | 30 | FS2 |

| LINKING S3 | FS0 |
|---|---|
| LINKING SA | FS7 |

FIG. 10A

| Sync number | 24-bit sync body ⌐10T⌐ 10T⌐ | 6-bit sync ID |
|---|---|---|
| FS0 | #01 000 000 000 100 000 000 010 | 000 001 |
| FS1 | #01 000 000 000 100 000 000 010 | 010 010 |
| FS2 | #01 000 000 000 100 000 000 010 | 101 000 |
| FS3 | #01 000 000 000 100 000 000 010 | 100 001 |
| FS4 | #01 000 000 000 100 000 000 010 | 000 100 |
| FS5 | #01 000 000 000 100 000 000 010 | 001 001 |
| FS6 | #01 000 000 000 100 000 000 010 | 010 000 |
| FS7 | #01 000 000 000 100 000 000 010 | 010 101 |
| FS8 | #01 000 000 000 100 000 000 010 | 101 010 |

FIG. 10B

| Frame number | Frame Sync | Frame number | Frame Sync |
|---|---|---|---|
| 0 | FS0 | | |
| 1 | FS1 | 16 | FS5 |
| 2 | FS2 | 17 | FS3 |
| 3 | FS3 | 18 | FS2 |
| 4 | FS3 | 19 | FS2 |
| 5 | FS1 | 20 | FS5 |
| 6 | FS4 | 21 | FS6 |
| 7 | FS1 | 22 | FS5 |
| 8 | FS5 | 23 | FS1 |
| 9 | FS5 | 24 | FS1 |
| 10 | FS4 | 25 | FS6 |
| 11 | FS3 | 26 | FS2 |
| 12 | FS4 | 27 | FS6 |
| 13 | FS6 | 28 | FS4 |
| 14 | FS6 | 29 | FS4 |
| 15 | FS3 | 30 | FS2 |
| | | (Frm 495) | FS7 |

| | | |
|---|---|---|
| LINKING | S3 | FS8 |
| LINKING | SA | FS7 |

FIG. 11A

| Sync number | 24-bit sync body ⌐10T⌐10T⌐ | 6-bit sync ID |
|---|---|---|
| FS0 | #01 000 000 000 100 000 000 010 | 000 001 |
| FS1 | #01 000 000 000 100 000 000 010 | 010 010 |
| FS2 | #01 000 000 000 100 000 000 010 | 101 000 |
| FS3 | #01 000 000 000 100 000 000 010 | 100 001 |
| FS4 | #01 000 000 000 100 000 000 010 | 000 100 |
| FS5 | #01 000 000 000 100 000 000 010 | 001 001 |
| FS6 | #01 000 000 000 100 000 000 010 | 010 000 |
| FS7 | #01 000 000 000 100 000 000 010 | 010 101 |
| FS8 | #01 000 000 000 100 000 000 010 | 010 010 |

FIG. 11B

| Frame number | Frame Sync | Frame number | Frame Sync |
|---|---|---|---|
| 0 | FS0 | | |
| 1 | FS1 | 16 | FS5 |
| 2 | FS2 | 17 | FS3 |
| 3 | FS3 | 18 | FS2 |
| 4 | FS3 | 19 | FS2 |
| 5 | FS1 | 20 | FS5 |
| 6 | FS4 | 21 | FS6 |
| 7 | FS1 | 22 | FS5 |
| 8 | FS5 | 23 | FS1 |
| 9 | FS5 | 24 | FS1 |
| 10 | FS4 | 25 | FS6 |
| 11 | FS3 | 26 | FS2 |
| 12 | FS4 | 27 | FS6 |
| 13 | FS6 | 28 | FS4 |
| 14 | FS6 | 29 | FS4 |
| 15 | FS3 | 30 | FS2 |
| | | (Frm 495) | FS7 |

| LINKING S3 | FS8 |
|---|---|
| LINKING SA | FS7 |

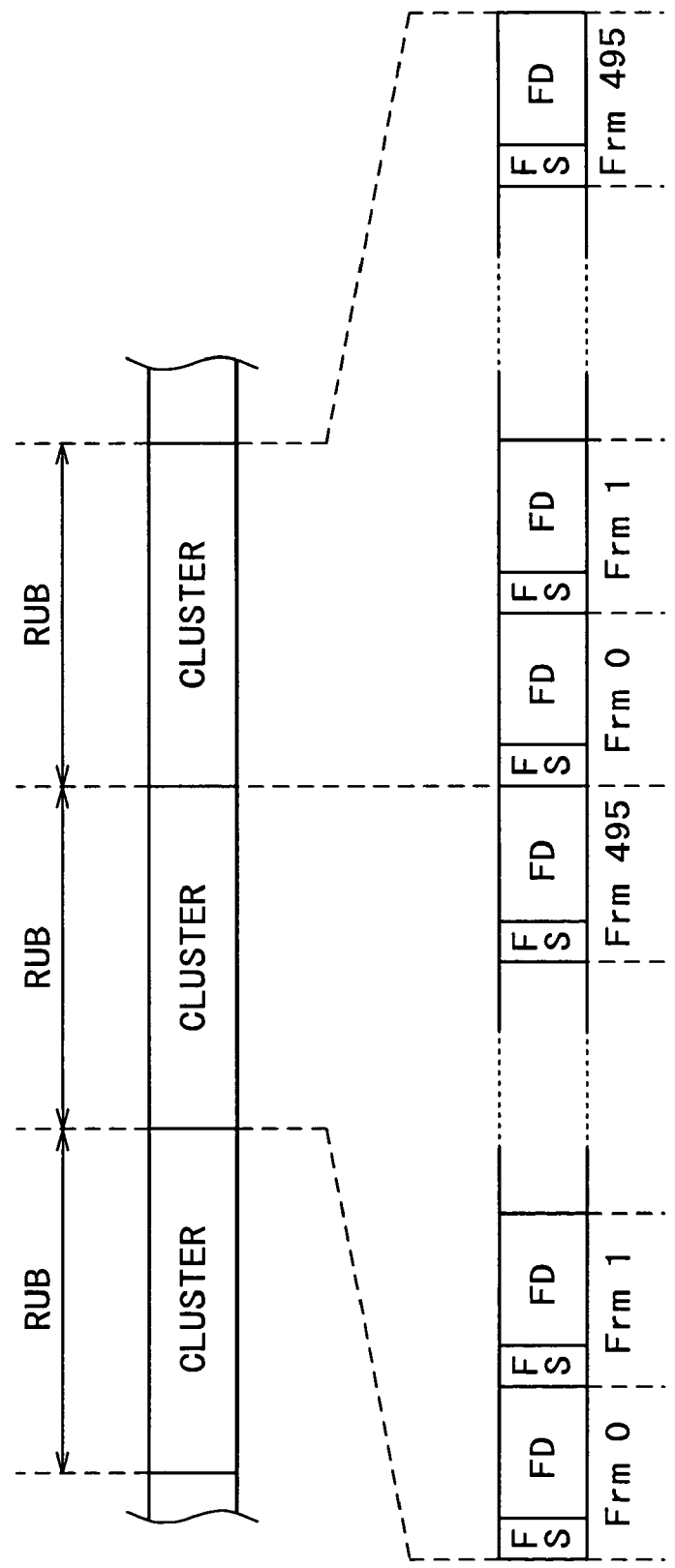

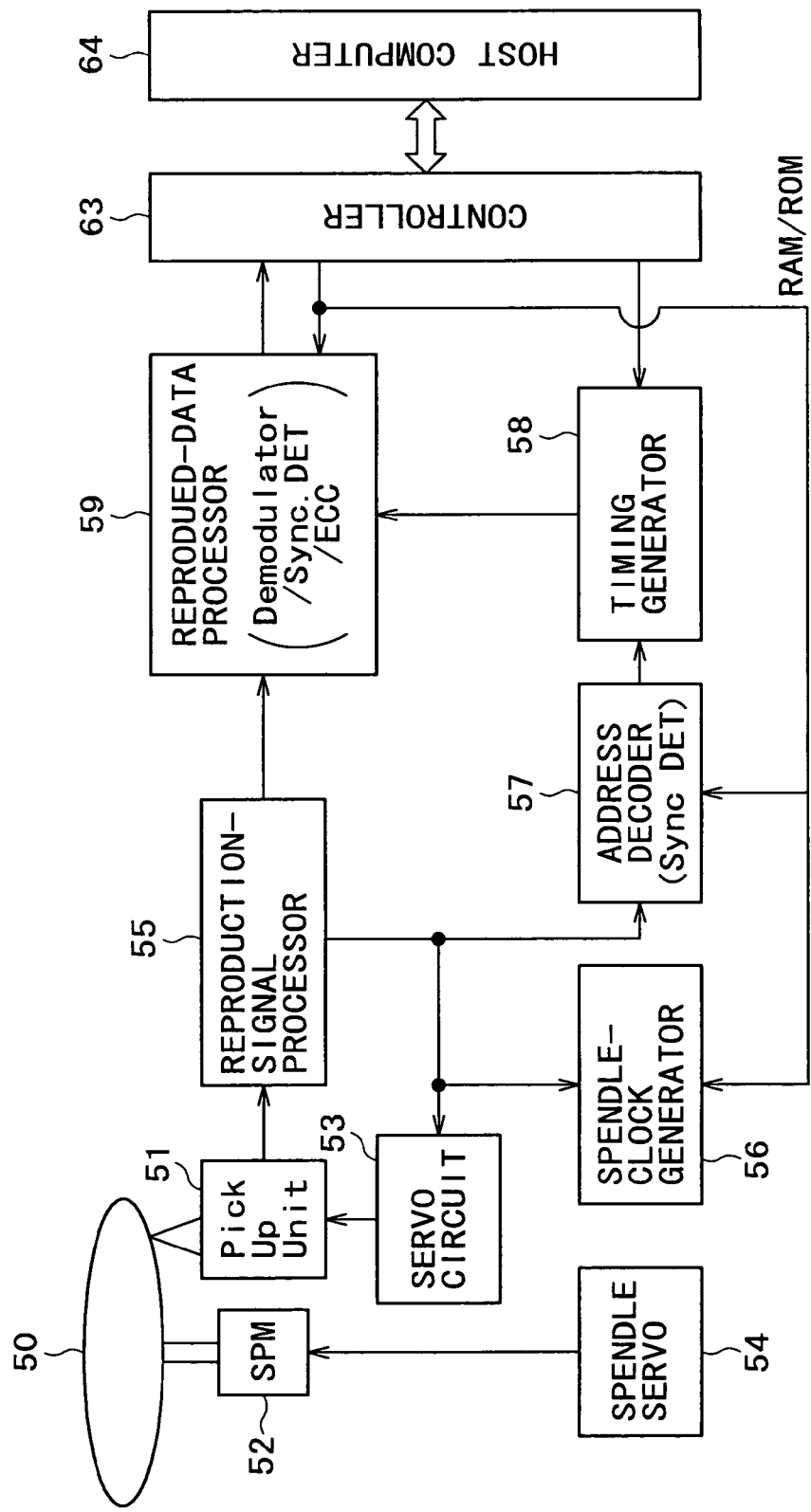

REPRODUCTION-ONLY RECORDING MEDIUM, REPRODUCTION DEVICE, REPRODUCTION METHOD

This application is a 371 of PCT/JP03/10858 Aug. 27, 2003.

TECHNICAL FIELD

The present invention relates to a recording medium such as an optical disk and, more particularly, the data format of a read-only recording medium. In addition, the present invention also relates to a reproduction apparatus and a reproduction method, which are capable of coping with a read-only recording medium and a recording/reproduction medium.

BACKGROUND ART

As a technology for recording and reproducing digital data, a data-recording technology using optical disks including a magneto-optical disk as recording media is known. Examples of the optical disk are a CD (Compact Disk), an MD (Mini-Disk) and a DVD (Digital Versatile Disk). An optical disk is the generic name of recording media implemented by a disk plate made of a metallic thin plate protected by plastic to serve as media from which a signal is read out as changes in light reflected thereby.

There are two types of optical disk, i.e., a read-only type and a recordable type allowing user data to be recorded thereon. Examples of the optical disk of the read-only type are a CD, a CD-ROM and a DVD-ROM, which are known already. On the other hand, examples of the optical disk of the recordable type are an MD, a CD-R, a CD-RW, a DVD-R, a DVD-RW, a DVD+RW and a DVD-RAM, which are also already known as well. Data can be recorded onto an optical disk of the recordable type by adoption of a recording method such as a magneto-optical recording method, a phase-change recording method or a pigment-film-change recording method. The pigment-film-change recording method is also known as a write-once recording method, which allows data to be recorded onto the disk only once and does not allow other data to be recorded over the recorded data. Thus, the pigment-film-change recording method is optimum for data-saving applications. On the other hand, the magneto-optical recording method and the phase-change recording method allow other data to be rewritten. Thus, the magneto-optical recording method and the phase-change recording method are adopted in a variety of applications such as applications to record mainly a variety of contents including musical data, video data, game software and an application program.

In addition, a high-density optical disk referred to as a DVR (Data & Video Recoding) has been developed in recent-years to substantially increase the recording capacity of the disk.

A high-density disk such as the DVR has a structure including a cover layer with a thickness of about 0.1 mm in the thickness direction of the disk. In this structure, phase-change marks are recorded and reproduced under a condition of applying a combination of a laser having a wavelength of 405 nm and an objective lens with an NA of 0.85. The laser having a wavelength of 405 nm is referred to as the so-called blue laser. The structure has a track pitch of 0.32 microns and a line density of 0.12 microns/bit. In the structure, a data block having a size of 64 KB (kilobytes) is used as a recording/reproduction unit. At a format efficiency of 82%, a disk having a diameter of 12 cm allows data of an amount of 23.3 GB (gigabytes) to be recorded thereon and data already recorded there on to be reproduced.

In addition, at the same format, if the line density is increased to 0.112 microns/bit, the recording/reproduction capacity of the disk can be raised to 25 GB.

Furthermore, in a multi-layer structure including a plurality of recording layers, a considerably increased recording/reproduction capacity can be realized. In a multi-layer structure including two recording layers, for example, the recording/reproduction capacity can be doubled to 46.6 GB or 50 GB.

By the way, in a read-only disk among the various optical disks cited above, data is basically recorded in error correction block units as pits such as emboss pits created in advance on the disk. As explained above, an example of the read-only disk is a DVD-ROM. In addition, in accordance with a known conventional data format of a read-only disk, data is recorded onto a contiguous area, which does not split any error correction block. In such a format, the error correction block is used as the error correction block unit, implying that a linking area (or a buffer area) is not created between blocks.

Much like a read-only disk, data is basically recorded onto and reproduced from a recordable disk (or a recording/reproduction disk) in error correction block units.

In this case, however, taking random-access recordability into consideration, a linking area may be created between blocks.

The use of linking areas offers a merit that random accesses to blocks in a recording/reproduction apparatus can be realized by hardware less expensive than a data format without linking areas.

In a method of recording a block onto a contiguous area uninterrupted by a linking portion, on the other hand, the operation to read out data is not stable till a PLL (Phase Locked Loop) of a read clock signal gets into a steady state so that there is a danger of generating a read data error. This is because linking areas do not exist. Thus, from the random-accessibility point of view, this method has a disadvantage.

In the case of a read-only disk, however, the random-access recording does not have to be taken into consideration. Thus, linking areas are not required.

For this reason, basically, the read-only disk and the recording/reproduction disk are considered to be disks of the same type. For example, a DVD-ROM used as a read-only disk and a DVD-RAM used as a recording/reproduction disk can be considered to be disks of the same type. Other examples are the recording/reproduction disk and the read-only disk serving as the high-density disk (DVR) cited above.

Mutual reproduction compatibility is required of such disks of the same type. If there is a difference in data-arranging method (or data format) between the read-only disk having no linking areas and the recording/reproduction disk having linking areas, however, the compatibility inevitably deteriorates.

That is to say, in such a case, a reproduction apparatus designed for both the read-only disk and the recording/reproduction disk needs to have components built for the read-only disk and components for the recording/reproduction disk, and the apparatus must switch the configuration from a set of components to another set of components in dependence on which disk is used as an object of data reproduction. The components include a timing generation circuit, a synchronization circuit, other similar pieces of hardware, pieces of firmware and pieces of software.

In a word, in order to sustain compatibility, a bigger load must be imposed on the configuration of the reproduction apparatus.

DISCLOSURE OF THE INVENTION

It is thus an object of the present invention to implement a read-only recording medium having a data format highly compatible with a recording/reproduction medium.

In a read-only recording medium provided by the present invention as a read-only recording medium for recording read-only data in the form of a sequence of blocks each used as an information recording/reproduction unit, each of the blocks has a data run-in serving as a front-end buffer area, a cluster including a plurality of successive frames each including sync data besides main data and a data run-out serving as a rear-end buffer area, and the blocks are recorded on the read-only recording medium in a data format including at least pieces of sync data recorded at locations separated from each other in the front-end and rear-end buffer areas, which are allocated to respectively the data run-in and the data run-out on a boundary between any consecutive two of the blocks, by a distance equal in length to a sync-data gap in the successive frames. Such a data format is formed to record read-only data.

In addition, in accordance with the data format described above, in the buffer areas, the pieces of sync data are recorded only at the locations separated from each other by a distance equal in length to the sync-data gap in the successive frames. Such a data format is formed to record read-only data.

Furthermore, a data pattern of at least one of the pieces of sync data in the buffer areas is different from a data pattern of sync data provided among the successive frames.

Moreover, in the read-only recording medium provided by the present invention, a data pattern of a second inversion gap is used as sync data recorded among the successive frames and in the buffer areas in contrast to a data pattern of a first inversion gap, which is used as sync data recorded in a recording/reproduction medium allowing data to be recorded thereon and allowing data already recorded thereon to be reproduced. Much like the read-only recording medium provided by the present invention as described above, in the recording/reproduction medium: the data is recorded on the recording/reproduction medium as a sequence of blocks each used as an information recording/reproduction unit; and each of the blocks has a data format including a data run-in serving as a front-end buffer area, a cluster including a plurality of successive frames each including sync data besides main data and a data run-out serving as a rear-end buffer area.

A reproduction apparatus provided by the present invention is a reproduction apparatus for reproducing data from both the recording/reproduction medium using a data pattern of a first inversion gap as sync data and the read-only recording medium using a data pattern of a second inversion gap as sync data.

The reproduction apparatus includes read means for reading out information from recording media mounted thereon, data-decoding means for carrying out a frame synchronization process and a data-decoding process on the basis of sync data detected from information read out by the read means from the mounted recording media, address-decoding means for carrying out a frame-address detection process on the basis of sync data detected from information read out by the read means from the mounted recording medium, and control means for executing control to carry out a process to detect the sync data by detecting a data pattern of the second inversion gap in the case of the read-only recording medium serving as the mounted recording media, or a process to detect the sync data by detecting a data pattern of the first inversion gap in the case of the recording/reproduction medium serving as the mounted recording media.

A reproduction method provided by the present invention is a reproduction adopted in a reproduction apparatus for reproducing data from both the recording/reproduction medium using a data pattern of a first inversion gap as sync data and the read-only recording medium using a data pattern of a second inversion gap as sync data. The reproduction method includes the steps of determining whether recording media mounted on the reproduction apparatus is the recording/reproduction medium or the read-only recording medium, carrying out a process to detect the sync data by detecting a data pattern of the second inversion gap if the mounted recording media is the read-only recording medium or a process to detect the sync data by detecting a data pattern of the first inversion gap if the mounted recording media is the recording/reproduction medium, and carrying out a frame synchronization process, a data-decoding process and a frame-address detection process on the basis of the detected sync data.

The data format (or the data-arranging method) adopted by the read-only recording medium provided by the present invention as described above includes buffer areas for keeping compatibility with a recording/reproduction medium at the front and rear ends of each of blocks used as units in which data is recorded onto and reproduced from the recording medium. The buffer area preceding a block serves as a data run-in, and the buffer area succeeding a block serves as a data run-out.

In addition, pieces of sync data are recorded at locations separated from each other in the buffer areas, which serve as the data run-in and the data run-out, by a distance equal in length to a sync-data gap in successive frames. Thus, the sync data always appears at equal intervals in the reproduced signal.

Furthermore, the reproduction apparatus and the reproduction method provided by the present invention are capable of coping with a difference in inversion gap between the sync pattern of the read-only recording medium and the sync pattern of the recording/reproduction medium.

BRIEF DESCRIPTION OF DRAWINGS

FIG. 5A is an explanatory diagram showing sync patterns of a frame sync used in the RAM disk and FIG. 5B is an explanatory diagram showing an order in which the frame sync patterns are arranged in the RAM disk.

FIG. 6A is an explanatory diagram showing [Example 1] as typical sync patterns of a frame sync used in the ROM disk and FIG. 6B is an explanatory diagram of [Example 1] showing an order in which the sync patterns are arranged in the ROM disk.

FIG. 7A is an explanatory diagram showing [Example 2] as typical sync patterns of the frame sync used in the ROM disk and FIG. 7B is an explanatory diagram of [Example 2] showing an order in which the typical sync patterns are arranged in the ROM disk.

FIG. 8A is an explanatory diagram showing [Example 3] as typical sync patterns of the frame sync used in the ROM disk and FIG. BB is an explanatory diagram of [Example 3] showing an order in which the typical sync patterns are arranged in the ROM disk.

FIG. 9A is an explanatory diagram showing [Example 4] as typical sync patterns of the frame sync used in the ROM disk and FIG. 9B is an explanatory diagram of [Example 4] showing an order in which the typical sync patterns are arranged in the ROM disk.

FIG. 10A is an explanatory diagram showing [Example 5] as typical sync patterns of the frame sync used in the ROM disk and FIG. 10B is an explanatory diagram of [Example 5] showing an order in which the typical sync patterns are arranged in the ROM disk.

FIG. 11A is an explanatory diagram showing [Example 6] as typical sync patterns of the frame sync used in the ROM disk and FIG. 11B is an explanatory diagram of [Example 6] showing an order in which the typical sync patterns are arranged in the ROM disk.

FIG. 12 is an explanatory diagram showing a typical data format ③ of the ROM disk implemented by the embodiment.

FIG. 13 is a block diagram showing a reproduction apparatus implemented by an embodiment of the present invention.

BEST MODE FOR CARRYING OUT THE INVENTION

Figure 1:
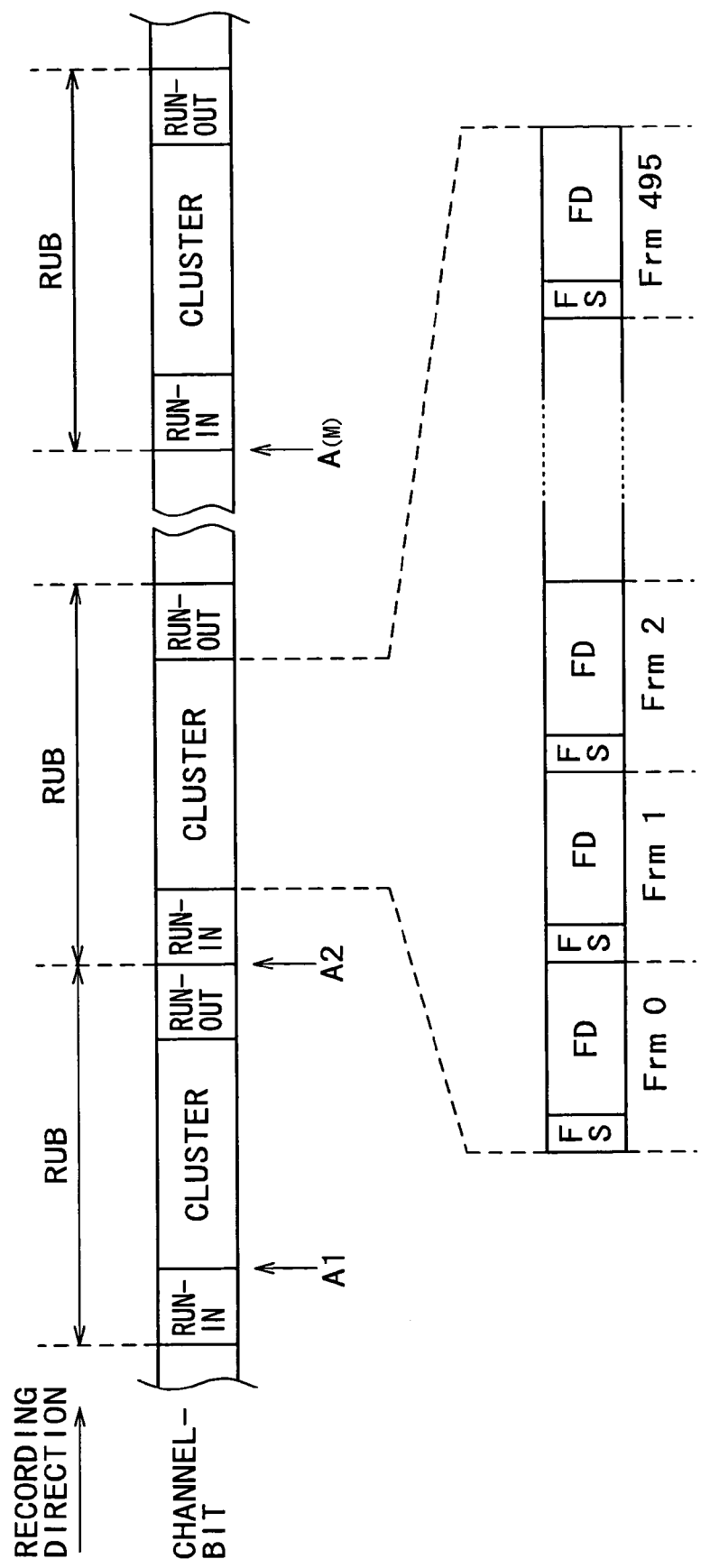
FIG. 1 is an explanatory diagram showing the structure of a RUB used in a RAM disk and a ROM disk implemented by an embodiment of the present invention.

In the following description, as an embodiment implementing a read-only recording medium provided by the present invention, a read-only optical disk is explained. In addition, the following description also explains a reproduction apparatus capable of reproducing data from the read-only optical disk and a recording/reproduction disk also allowing data to be recorded thereon.

It is to be noted the read-only optical disk implemented by the embodiment is referred to hereafter as a ROM disk and the recording/reproduction optical disk is referred to hereafter as a RAM disk. The description is given in paragraphs arranged as follows:
1. Data Format of RAM Disks
2. Typical Data Format of ROM Disks ①
3. Typical Data Format of ROM Disks ②
4. Sync Patterns and Their Order
5. Typical Data Format of ROM Disks ③
6. Reproduction Apparatus 1. Data Format of RAM Disks The ROM disk implemented by the embodiment has one object to provide a data format highly compatible with the RAM disk. For this reason, prior to explanation of the data format of the ROM disk implemented by the embodiment, the data format of the RAM disk is explained.

The RAM disk cited above is considered to be a disk pertaining to the category of high-density disks mentioned earlier as a DVR disk.

That is to say, the RAM disk is an optical disk with a structure having a diameter of 12 cm and a cover layer with a thickness of about 0.1 mm in the thickness direction of the disk. In this structure, phase-change marks are recorded and reproduced under a condition of applying a combination of a laser having a wavelength of 405 nm and an objective lens with an NA of 0.85. The laser having a wavelength of 405 nm is referred to as the so-called blue laser. The structure has a track pitch of 0.32 microns and a line density of 0.12 microns/bit. In the structure, a data block having a size of 64 KB (kilobytes) is used as a recording/reproduction unit.

The recording/reproduction unit of the RAM disk used as a DVR disk has a total of 498 frames. 156 symbols×the 496 frames form an ECC block (a cluster) and the remaining 2 frames are added before and after the ECC block to serve as a link area for, among other purposes, PLL synchronization. This recording/reproduction unit is referred to as an RUB (Recording Unit Block).

It is to be noted that, in the case of a RAM disk, a groove having a wobbling shape is created on the disk. This wobbling disk is used as a recording track. The wobbling shape of the groove includes the so-called ADIP data. That is to say, by detection of wobbling information embedded in the groove, an address on the disk can be obtained.

On the wobbling groove created as a recording track, recording marks are recorded as phase-change marks. The phase-change marks are recorded at a line density of 0.12 microns/bit and 0.08 microns/channel bit typically by adoption of an RLL (1, 7) PP modulation method where the RLL is an abbreviation of Run Length Limited and the PP is an abbreviation of Parity preserve/Prohibit rmtr (repeated minimum transition runlength).

If 1 channel bit is taken as 1 T, the length of a mark is in the range 2 T to 8 T providing a minimum mark length of 2 T.

The structure of the RUB used as the unit (recording/reproduction unit) of reproduction channel data is shown in FIG. 1.

RUBs are recorded at a predetermined location specified by an address as a location on the disk, being arranged to form a continuous sequence beginning from a data-recording start position. FIG. 1 shows a case in which the RUBs are recorded as a sequence of M blocks starting from a RUB address A1.

A RUB has a configuration starting with a data run-in including 2,760 channel bits. This data run-in is also referred to hereafter simply as a run-in. The data run-in is followed by a cluster, which is a set of pieces of modulate user data and synchronization patterns. The configuration of the RUB ends with a data run-out including 1,104 channel bits. This data run-out is also referred to hereafter simply as a run-out.

The run-in and the run-out occupy an area referred to as a linking area.

As shown in the figure, the cluster includes 496 frames, i.e., frames 0 to 495. At the head of each frame, a frame sync FS is provided. The frame sync FS is followed by frame data FD. The frame sync FS includes 30 channel bits. The frame data FD is the recorded user data.

Figure 2:
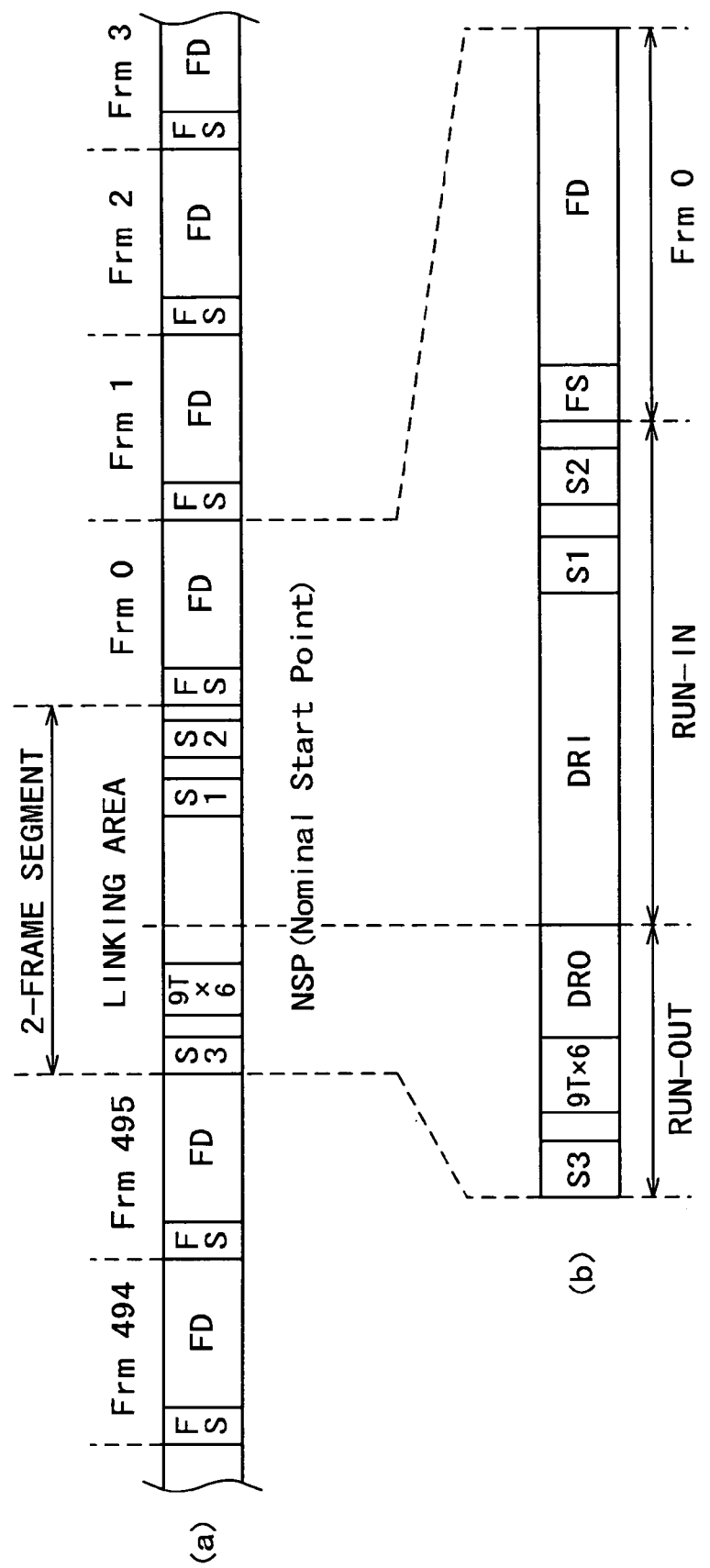
FIG. 2 is an explanatory diagram showing the data format of the RAM disk.

FIG. 2 is a diagram showing details of the linking area provided on the boundary between two consecutive RUBs as an area occupied by the run-in and the run-out.

As shown in FIG. 2(a), a portion of a run-out following the last frame (frame 495) of any specific RUB overlaps a portion of a run-in preceding the first frame (frame 0) of a RUB following the specific RUB. The run-out and the run-in occupy a linking area, which is an interval having a length equal to the total size of two recorded frames. In other words, when a specific RUB is recorded at a location continuously following a preceding RUB, the location starts from an NSP (Nominal Start Point) inside the run-out of the preceding RUB so that the run-in of the specific RUB overlaps with the rear-end portion of the run-out of the preceding RUB.

This overlapping portions give no gap between the preceding RUB and a newly written RUB.

This 2-frame interval serving as a linking area occupied by a run-out and a run-in may be provided with a variety of functions of an RUB buffer.

For example, the run-in is used as an area for pulling-in a PLL clock signal at a data recording/reproduction time. In addition, the run-in can be used for APC (Auto Power Control) of a laser power at a data recording time. If the run-in has a guard area for overlapping at a recording time, for example, the area can be used for recording a signal pattern for the auto control of the power of a light source.

The run-out can be used for a number of purposes as well. Much like the run-in, the run-out is a buffer area for coping with variations in recording position, which are caused by an SPS and the precision of a recording start position. It is to be noted that the SPS standing for a standard position shift means a position shift, which results when the start position of each recording unit block is shifted from the nominal start position (NSP) by a distance corresponding to a random number of channel bits in order to prevent the disk from excessively deteriorating due to recording operations carried out repeatedly.

The run-out can also be used as a buffer area provided on the time base as a buffer for a process consuming time such as a Viterbi decoding process and a waveform equalization process at a reproduction time. If the run-out has a post-amble for time control of signal processing, the post-amble can be used for recording a signal pattern for the PLL of a reproduction clock signal. As this pattern, it is desirable to use a repetitive pattern optimum for the PLL of the reproduction clock signal used in a process consuming time such as a Viterbi decoding process and a waveform equalization process at a reproduction time.

In addition, at the end of a block-recording process, the run-out can be used for the APC of the laser power.

FIG. 2(b) is a diagram showing data DRO in a run-out and data DRI in a run-in. Typically, the areas occupied by the pieces of data DRO and DRI can be used for the data and the pattern, which are provided for the purposes described above.

As shown in FIGS. 2(a) and 2(b), the linking area including a run-out and a run-in is used for recording pieces of sync data S1, S2 and S3 as well as a 6-repeated-9T pattern (a 9T×6 pattern).

Described in detail later, the frame sync FS included in each frame described above includes a 2-consecutive-9T sync pattern. By the same token, the pieces of sync data S1, S2 and S3 each also include a 2-consecutive-9T sync pattern.

The portions including the three sync patterns of the pieces of sync data S1 and S2 as well as the frame sync FS at the beginning of first frame (frame 0) allow frame synchronization to be established with a high degree of reliability. That is to say, at a reproduction time, the run-in portion is first used for pulling-in the PLL clock signal. Then, the portions including the pieces of sync data S1 and S2 as well as the FS are used for pulling-in the frame.

In addition, the 6-repeated-9T pattern included in the run-out is provided as a pattern for detecting the end of an operation to reproduce block data. That is to say, the reproduction apparatus is capable of detecting the end of a block by detecting a 6-repeated-9T unique pattern in an RUB.

The data format of such a RAM disk has the following properties:

Data is recorded onto the RAM disk in RUB units. In processes to record and reproduce data in RUB units, the linking area functions as a buffer to improve the random accessibility.

By virtue of the SPS obtained as a result of shifting a start position as described above, the disk can be prevented from deteriorating due to an operation carried out repeatedly to rewrite the same data onto the disk. This SPS operation can be carried out because the linking area functions as a buffer.

At a reproduction time, a reproduction PLL clock signal is brought over by using a run-in and a frame and a frame is brought over by using the pieces of sync data S1 and S2 as well as the FS with a high degree of reliability.

An inter-frame gap of sync data in the linking area is not the same as a uniform gap between frame portions, i.e., frames 0 to 495. That is to say, at a position corresponding to the beginning of the second frame in the linking area having a size equivalent to two frames, no sync data is included. This is because, in the RAM disk, a recording unit is completely formed as a RUB unit to the bitter end so that the linking area does not have to include the same inter-frame gap as the frame sync serving as the uniform gap between frame portions. In addition, this is also because the run-in and run-out portions overlap each other, and an SPS operation is carried out. Other reasons include the fact that it is desirable to provide a data pattern in the form of a short inversion gap for pulling-in the clock signal at about the position corresponding to the beginning of the second frame and the fact that the existence of a sync in the form of a long inversion gap with a size of 9 T at this location is not proper. In FIG. 2, the position corresponding to the beginning of the second frame is a position included in the data DRI of the run-in.

It is to be noted that, in the RAM disk, an address can be obtained from the wobbling groove. Thus, the importance of an address recorded in a frame is relatively little in comparison with the ROM disk.

In addition, a rotational speed of the disk can be obtained from information embedded in the wobbling groove. This means that it is not necessary for syncs to appear regularly on a data array. That is to say, it is not necessary to detect a rotational speed from intervals at which syncs appear. For this reason, there is no problem caused by the fact that an appearance gap of sync data in the linking area is irregular.

2. Typical Data Format of ROM Disks ①

The following description explains a first typical data format ① of the ROM disk implemented by the embodiment as a data format highly compatible with the RAM disk described above.

When compatibility with the RAM disk is taken into consideration, first of all, it is possible to think of a ROM disk having a data format entirely identical with the data format of the RAM disk shown in FIG. 2. That is to say, the data format of the RAM disk is provided with a linking area including a run-out and a run-in, and the linking area includes pieces of sync data S1, S2 and S3 as well as a 6-repeated-9T pattern (a 9T×6 pattern) as shown in FIG. 2.

By providing such a data format, however, the appearance gap of syncs in the linking portion becomes irregular, raising the following problems.

In the case of a ROM disk, no wobbling groove is formed on the surface of the disk. Instead, a track is formed on the surface of the ROM disk as a pit array. That is to say, neither an address nor a rotational speed of the ROM disk can be detected from such a wobbling groove. For this reason, in the case of the ROM disk, sync data is used for generating a timing signal for a spindle PLL. This is because syncs appear regularly in a continuous frame portion so that, even in an asynchronous state, a sync appearance gap can be used as information indicating the rotational speed. Thus, on the basis of sync detection, spindle-rotation control can be executed.

In such a case, the fact that the sync appearance gap in the run-out and run-in portions is irregular makes it impossible to properly obtain a timing signal in the linking portion. Thus, the timing signal obtained in the linking portion is incorrect or inaccurate. The incorrect or inaccurate timing signal raises a problem of incorrect generation of a phase-error signal in the spindle PLL using a sync pattern.

In addition, in order to cope with irregular syncs in the linking portion, it is necessary to make a synchronization circuit keep up with the variable sync portion of the irregular syncs so that, in consequence, the synchronization circuit unavoidably becomes complicated and large in scale. Thus, also from the standpoint of pull-in synchronization, a problem is raised.

Accordingly, in the embodiment, the data format of the ROM disk is set as follows.

First of all, the RUB structure of the ROM disk implemented by this embodiment is set into the same structure shown in FIG. 1. That is to say, the RUB includes a run-in serving as a buffer, a cluster composed of 496 frames, i.e., frames 0 to 495, and a run-out also serving as a buffer.

Figure 3:
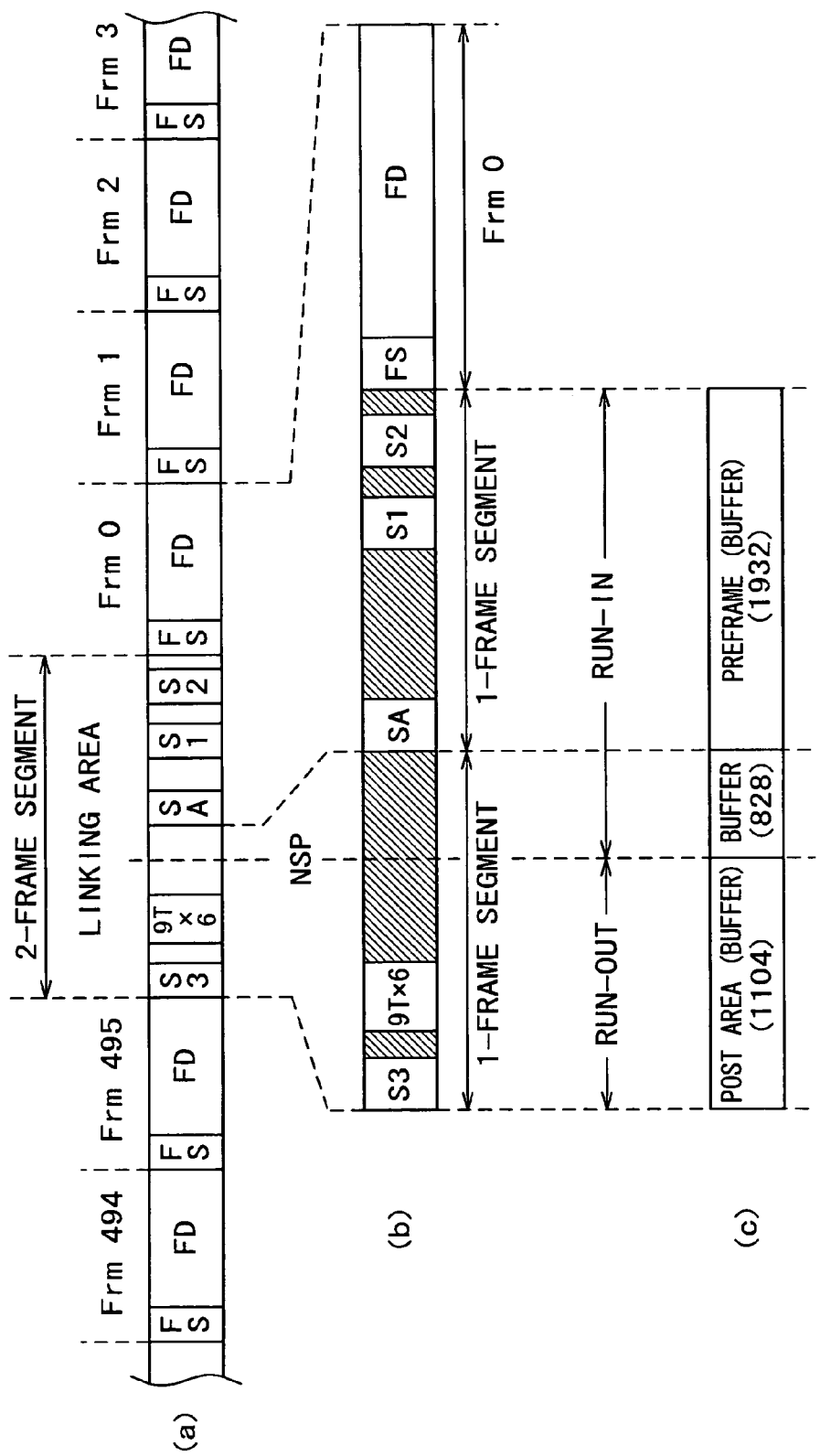
FIG. 3 is an explanatory diagram showing a typical data format ① of the ROM disk implemented by the embodiment.

FIG. 3 is a diagram specially showing details of the linking portion of the ROM disk implemented by the embodiment.

As shown in FIG. 3(*a*), a linking area having a size of two frames composing a run-out and a run-in is an interval between the last frame (frame 495) of a frame preceding the linking area and the first frame (frame 0) of the next RUB following the linking area.

The rear end of a RUB is a post area including 1,104 channel bits as shown in FIG. 3(*c*). This post area is the run-out.

On the other hand, the front end of a RUB is a buffer area including 828 channel bits and a preframe including 1,932 channel bits. This front end is the run-in.

The linking area (or the buffer area) including a run-out and a run-in as described above is identical with the RAM disk and, hence, offers an advantage to the compatibility with the RAM disk.

As shown in FIGS. 3(*a*) and 3(*b*), the linking area including the run-out and the run-in is used for recording pieces of sync data S1, S2 and S3 as well as a 6-repeated-9T pattern (a 9T×6 pattern) in the same way as the data format of the RAM disk shown in FIG. 2.

In the case of the data format of the ROM disk, however, the linking area also includes sync data SA as shown in the figure.

As is obvious from FIG. 3(*b*), this sync data SA is provided at the head position of a segment occupied by the second frame of the linking area, which has a size of two frames.

On the other hand, the sync data S3 is provided at the head position of a segment occupied by the first frame of the linking area having a size of two frames as described above. In this way, the sync data S3 and the sync data SA, which are provided in the linking area, and the frame sync FS provided at the head position of each of the frames (frames 0 to 495) are located at equal intervals to appear as sync patterns. The equal intervals are each an interval having a length of 1 frame.

It is to be noted that each darkened area shown in FIG. 3(*b*) can be any recorded data or a recorded pattern. If a darkened area is to be used for recording a pattern for pulling-in a reproduction clock signal, for example, a pattern with a relatively short inversion gap may be conceivably recorded therein.

In addition, predetermined control data and/or predetermined dummy data may also be recorded therein.

By constructing the data format of the ROM disk implemented by the embodiment as described above, the following effects can be obtained.

By providing a linking area, a frame-decoding process common to the RAM disk can be carried out, offering an advantage to the compatibility with the RAM disk. In addition, the linking area also provides excellent random accessibility. That is to say, the reproduction apparatus for both the RAM and ROM disks can be designed with ease so that the apparatus can be simplified and the cost of the apparatus can be reduced.

The sync data SA is recorded at a location, for which no data is prescribed in particular from the beginning in the RAM disk. Thus, the sync data SA has almost no effect on the data format of the RAM disk.

Since a sync pattern is generated regularly for every frame including the first frame provided in the linking area as a frame starting with the sync data S3 and the second frame provided in the linking area as a frame starting with the sync data SA, the data format has merits in frame synchronization protection and a process for pulling-in frame synchronization.

Since the ROM disk does not have a wobbling groove, information on the spindle rotational speed can be obtained on the basis of sync detection, which can be well carried out due to the fact that a sync pattern is generated regularly for every frame. That is to say, the data format offers an advantage to the generation of a phase error signal of the spindle PLL using sync patterns. In particular, information on the spindle rotational speed can be obtained from intervals, at which sync patterns are generated, even in a PLL asynchronous state.

3. Typical Data Format of ROM Disks ②

The following description explains a better typical data format of the ROM disk ② implemented by the embodiment.

Also in this case, the RUB structure of the ROM disk implemented by this embodiment is set into the same structure of the RAM disk shown in FIG. 1. That is to say, the RUB includes a run-in serving as a buffer, a cluster composed of 496 frames, i.e., frames 0 to 495, and a run-out also serving as a buffer.

Figure 4:
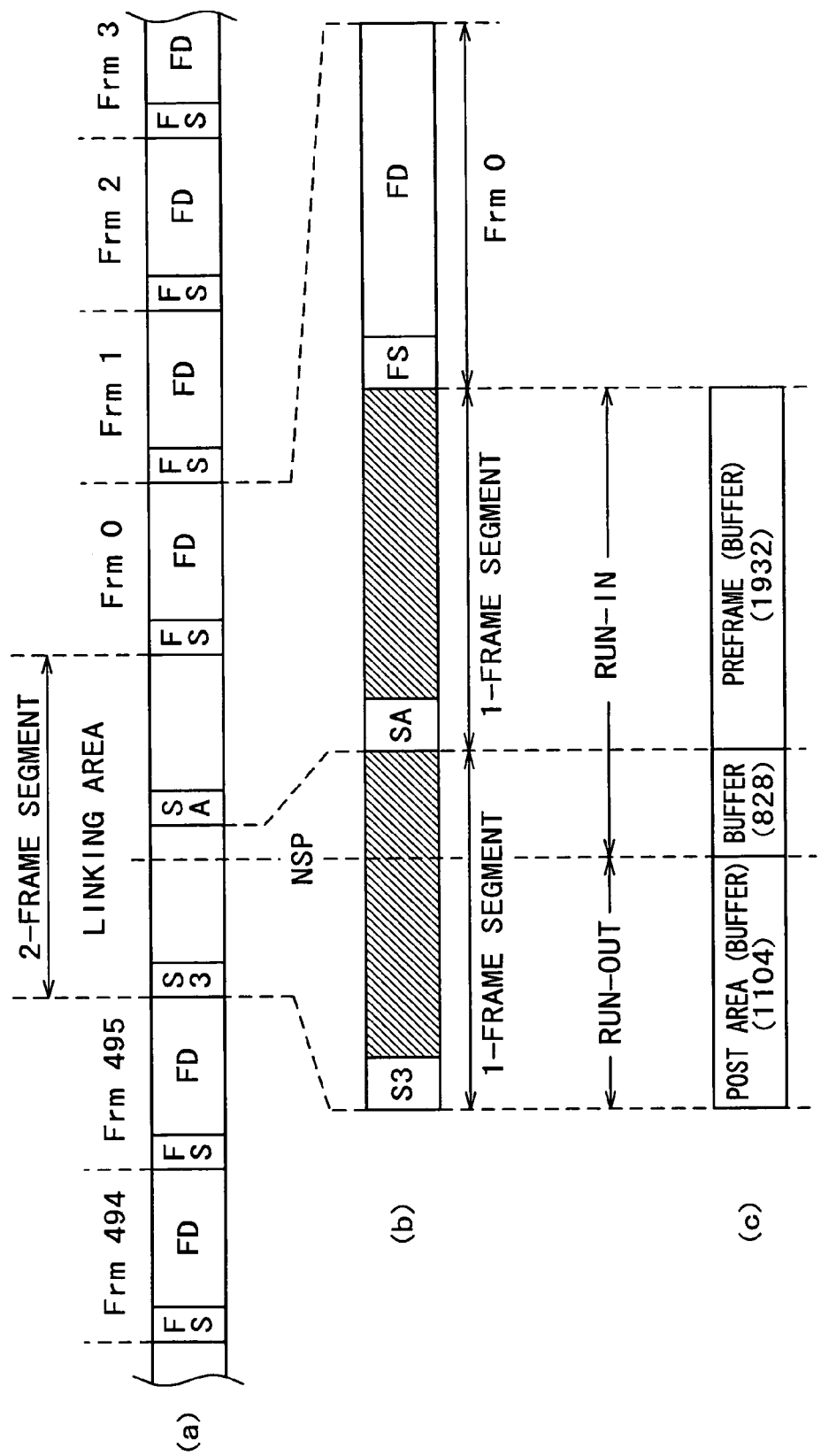
FIG. 4 is an explanatory diagram showing a typical data format ② of the ROM disk implemented by the embodiment.

FIG. 4 is a diagram specially showing details of the linking portion of the ROM disk implemented by the embodiment.

As shown in FIG. 4(*a*), a linking area having a size of two frames composing a run-out and a run-in is an interval between the last frame (frame 495) of a frame preceding the linking area and the first frame (frame 0) of the next RUB following the linking area.

The rear end of a RUB is a post area including 1,104 channel bits as shown in FIG. 4(*c*). This post area is the run-out.

On the other hand, the front end of a RUB is a buffer area including 828 channel bits and a pre frame including 1,932 channel bits. This front end is the run-in.

The linking area (or the buffer area) including a run-out and a run-in as described above is identical with the RAM disk and, hence, offers an advantage to the compatibility with the RAM disk.

As shown in FIGS. 4(*a*) and 4(*b*), the linking area including the run-out and the run-in is not recorded pieces of sync data S1 and S2 as well as a 6-repeated-9T pattern (a 9T×6 pattern) in the same way as the data format of the RAM disk shown in FIG. 2.

The linking area also includes pieces of sync data SA and S3 as shown in the figure.

As is obvious from FIG. 4(*b*), this sync data SA is provided at the head position of a segment occupied by the second frame of the linking area, which has a size of two frames.

On the other hand, the sync data S3 is provided at the head position of a segment occupied by the first frame of the linking area having a size of two frames as described above. In this way, the sync data S3 and the sync data SA, which are provided in the linking area, and the frame sync FS provided at the head position of each of the frames (frames 0 to 495) are located at equal intervals to appear as sync patterns. The equal intervals are each an interval having a length of one frame.

That is to say, the pieces of sync data S1 and S2 as well as a 6-repeated-9T pattern (a 9T×6 pattern), which are included in the typical data format of the ROM disk ①, are excluded from the typical data format ②.

It is to be noted that each darkened area shown in FIG. 4(*b*) can be any recorded data or a recorded pattern. If a darkened area is to be used for recording a pattern for pulling-in a reproduction clock signal, for example, a pattern with a relatively short inversion gap can be conceivably recorded therein. In addition, predetermined control data or predetermined dummy data may also be recorded therein.

By constructing the data format of the ROM disk implemented by the embodiment as described above, the following effects can be obtained.

By providing a linking area, a frame-decoding process common to the RAM disk can be carried out, offering an advantage to the compatibility with the RAM disk. In addition, the linking area also provides excellent random accessibility. That is to say, the reproduction apparatus for both the RAM and ROM disks can be designed with ease so that the apparatus can be simplified and the cost of the apparatus can be reduced.

The sync data SA is recorded at a location, for which no data is prescribed in particular from the beginning in the RAM disk. Thus, the sync data SA has almost no effect on the data format of the RAM disk.

Since a sync pattern is generated regularly for every frame including the first frame provided in the linking area as a frame starting with the sync data S3 and the second frame provided in the linking area as a frame starting with the sync data SA, the data format is advantageous in frame synchronization protection and a process for pulling-in frame synchronization.

Since the ROM disk does not have a wobbling groove, information on the spindle rotational speed can be obtained on the basis of sync detection, which can be adequately carried out due to the fact that a sync pattern is generated regularly for every frame. That is to say, the data format offers an advantage to the generation of a phase error signal of the spindle PLL using sync patterns. In particular, information on the spindle rotational speed can be obtained from intervals, at which sync patterns are generated, even in a PLL asynchronous state.

In the typical data format ① described above, in addition to the pieces of sync data SA and S3 provided at frame intervals, the linking area also includes the pieces of sync data S1 and S2 as well as the 6-repeated-9T pattern (a 9T×6 pattern), which are each a pattern of sync data. As a sync pattern, however, the pieces of sync data S1 and S2 as well as the 6-repeated-9T pattern appear irregularly and, hence, serve as a disturbance to generation of the phase error signal of the spindle PLL. In some cases, the pieces of sync data S1 and S2 as well as the 6-repeated-9T pattern cause incorrect recognition of the sync patterns generated at the equal intervals and, hence, incorrect detection of wrong information on the rotational speed. Thus, the elimination of the pieces of sync data S1 and S2 as well as the 6-repeated-9T pattern from the second typical data format is a greater advantage to the generation of the phase error signal of the spindle PLL. It is to be noted that, as explained in the description of the data format of the RAM disk, the pieces of sync data S1 and S2 are provided as sync data for improving the performance of pull-in frames. In the case of a ROM disk for continuously recording user data, however, the performance of pull-in frames for each RUB unit is not that important. Thus, the pieces of sync data S1 and S2 are not so important. The detection of the end of a RUB by using the 6-repeated-9T pattern is also not that significant for the ROM disk. For these reasons, the elimination of the pieces of sync data S1 and S2 as well as the 6-repeated-9T pattern does not raise a problem.

4. Sync Patterns and Their Order

In the typical data format of the ROM disk ② and also in its typical data format ①, for example, as sync patterns, a frame sync FS provided for each of the frames (frames 0 to 495) as well as the pieces of sync data SA and S3, which are included in the linking area, are generated regularly at frame intervals.

In the case of the RAM disk, a frame number assigned to each frame can be detected from the frame sync FS provided for the frame.

For the purpose of data internal addressing, frames composing a RUB are divided into 16 address units, which are each a physical sector. Since a RUB includes 496 frames, the 16 physical sectors composing the RUB each include 31 frames.

Each physical sector including 31 frames of a RUB includes a recorded address of the physical sector in the RUB. Typically, the address of a physical sector is recorded at predetermined locations in the first 3 frames from the beginning of the RUB, that is, frames 0, 1 and 2.

Then, by detecting the pattern of a frame sync FS, frame numbers 0 to 30 assigned to the 31 frames composing a physical sector can be detected so that the address of each frame can be determined. That is to say, it is possible to obtain the data internal address of a frame as a combination of a frame number assigned to the frame and a sector number assigned to the RUB physical sector including the frame.

<Frame Syncs of RAM Disks>

Prior to explanation of the frame sync of a ROM disk, first of all, the frame sync of a RAM disk is described.

A frame sync FS including 30 channel bits is provided at the beginning of each of the frames composing a RUB, i.e., frames 0 to 495.

As shown in FIG. 5A, the frame sync FS is one of 7 defined sync patterns FS0 to FS6.

Each of the sync patterns FS0 to FS6 includes a sync body having a length of 24 bits and a sync ID having a length of 6 bits. The sync body is a 24-bit pattern, which does not abide by a RLL (1, 7) PP modulation rule. On the other hand, the sync ID is a signature serving as identification.

A sync pattern is determined by modulated bits. '1' in the bit examples shown in FIG. 5A indicates inversion of a signal. Prior to an operation to record such a frame sync code onto a disk, the frame sync code is converted into an NRZI channel bit stream. That is to say, the sync body is '010100000000010000000010' and becomes a pattern of two consecutive 9Ts inverted at '1' as shown in the figure.

The sync patterns FS0 to FS6 have the same sync body and are distinguished from each other by their sync IDs.

As described above, a RUB including 496 frames is divided into 16 physical sectors each including 31 frames. The 31 frames can be identified by using the frame syncs FSes appended to the frames.

However, 7 types of FS are not enough for identifying the 31 frames. Thus, the 7 types of frame sync FS, i.e., the sync patterns FS0 to FS6, are arranged in a predetermined order through the 31 frames, and a frame is identified by the preceding/succeeding combination of the sync patterns in the order.

As shown in FIG. 5B, the sync pattern FS0 is assigned to the first frame of each physical sector, that is, a frame having a frame number of 0. The other sync patterns FS1 and FS6 are assigned to the other frames having frame numbers 1 to 30 as shown in the figure.

As shown in FIG. 5B, the sync patterns FS0 to FS6 of the frame sync FS are assigned to the 31 frames in a determined order so that any specific one of the frames can be identified from a combination including the FS (frame sync) type appended to the specific frame and the FS (frame sync) type appended to a frame preceding the specific frame. To put it concretely, a frame number of n can be identified from a combination of a sync pattern appended to the specific frame and the sync pattern appended to any preceding frame having a frame number of (n−1), (n−2), (n−3) or (n−4).

For example, let the frame number assigned to the present frame be 5, that is, let the present frame be the fifth frame. In this case, even if the FS (frame sync) types assigned to the preceding first, second and third frames are lost, that is, even if the sync patterns FS1, FS2 and FS3 are lost, the frame number assigned to the present frame, that is, the frame number 5 assigned to the fifth frame, can be identified from a combination of the FS (frame sync) type appended to the immediately preceding frame and the FS (frame sync) type appended to the present frame, that is, from a combination of the sync pattern FS3 appended to the fourth frame and the sync pattern FS1 appended to the fifth frame. This is because the sync pattern FS3 is followed by the sync pattern FS1 only at a specific location in FIG. 5B, that is, at a location at which the frame number of 4 is followed by the frame number of 5.

It is to be noted that, as an exception, the sync pattern FS0 is used as the sync data S3 at the beginning of each linking area in the RAM disk. However the sync pattern FS0 is used as the sync data. S3 at the beginning of each linking area as shown in none of the figures.

<Typical Frame Syncs of ROM Disks>

EXAMPLE 1

The following description explains a variety of frame syncs applicable to the typical data formats ① and ② adopted by the ROM disk as shown in FIGS. 3 and 4, respectively.

Typical frame syncs [Example 1] are shown in FIGS. 6A and 6B. As shown in FIG. 6A, the typical frame syncs [Example 1] are the 7 defined sync patterns FS0 to FS6 as is the case with the frame syncs of the RAM disk.

As shown in FIG. 6B, the sync patterns FS0 to FS6 of the frame sync FS are assigned to the 31 frames in an order for identifying any of the frames. That is to say, the sync patterns FS0 to FS6 are associated with the frame numbers assigned to the frames for the same purpose of identifying the frames.

The sync pattern FS0 is used as the sync data S3 of the linking area shown in FIGS. 3 and 4.

As for the sync data SA, any of the sync patterns FS1 to FS6 is used. As an alternative, it is also possible to use a pattern including two consecutive 9T patterns as a sync body followed by no sync ID.

By using such typical frame syncs [Example 1], a frame-sync process common to the RAM disk can be carried out. Thus, the typical frame syncs [Example 1] offer an advantage to the compatibility.

<Typical Frame Syncs of ROM Disks>

EXAMPLE 2

Typical frame syncs [Example 2] are shown in FIGS. 7A and 7B. As shown in FIG. 7A, the second typical frame sync FS has a sync body of '01000000000100000000010'. That is to say, a 10T pattern is used.

Except for the use of a 10T pattern as the sync body, the typical frame syncs [Example 2] are the same as the typical frame syncs [Example 1]. To be more specific, sync patterns FS0 to FS6 are used as FS (frame sync) types and associated with frame numbers of 0 to 30, the sync data S3 and the sync data SA in a way similar to the typical frame syncs [Example 1].

As described above, in the case of the ROM disk, information on the spindle rotational speed can be obtained from sync intervals, and the inversion gap of data is 2T to 8T.

The use of a 9T pattern as a sync pattern is an advantage to the PLL of the reproduced signal. If a phase error signal for the spindle PLL is to be obtained on the basis of sync detection even in an asynchronous state, however, data with a maximum length of 8T and a 9T pattern used as a sync pattern most likely result in incorrect sync detection. That is to say, in a state in which the spindle PLL is not locked, the gap of the sync detection varies in accordance with the rotational speed. In such a case, however, it is quite within the bounds of possibility that an 8T portion of data is incorrectly recognized as a sync pattern. An example of the state in which the spindle PLL is not locked is a state in which the spindle rotational speed is not set at a predetermined value.

Taking the fact described above into consideration, it is desirable to use a 10T pattern as the sync patterns FS0 to FS6 for the ROM disk. That is to say, it is possible to lower the possibility of incorrectly recognizing an 8T portion of data, and the 10T pattern is advantageous to timing detection for the spindle PLL.

<Typical Frame Syncs of ROM Disks>

EXAMPLE 3

Typical frame syncs [Example 3] are shown in FIGS. 8A and 8B. As a sync pattern of the frame sync FS, the typical frame syncs [Example 3] include a sync pattern FS7 in addition to the sync patterns FS0 to FS6 used in the RAM disk.

To be more specific, as one of sync patterns distinguished from each other by using sync IDs, a sync pattern FS7 is provided in addition to the sync patterns FS0 to FS6 for the frame sync FS as shown in FIG. 8A.

It is to be noted that the sync body is a 9T pattern.

As shown in FIG. 8B, the sync patterns FS0 to FS6 are assigned to frame numbers of 0 to 30 in a way similar to the RAM disk.

The sync pattern FS0 is used as the sync data S3 of the linking area. In the case of the typical frame syncs [Example 3], however, the sync pattern FS7 is used as the sync data SA of the linking area.

In the case of the typical frame syncs [Example 1] described above, the sync patterns FS0 to FS6 are used to give basically the same frame syncs as the RAM disk.

In the case of the RAM disk, it is good enough to be able to identify a frame in a physical sector by using the frame sync FS. It is not necessary to take the linking area into consideration with regard to the frame identification. In addition, an accurate address can be obtained from an ADIP address embedded in the wobbling groove, should a frame number have been detected incorrectly.

On the basis of such a concept, the sync patterns FS0 to FS6 are set so that the 31 frames can be identified to the bitter end.

Also in the case of the ROM disk, if based on the concept that it is good enough to be able to identify each of the 31 frames composing a physical sector of the RUB, the typical frame syncs [Example 1] or [Example 2] are considered to be proper frame syncs.

If the use of a detected sync pattern is considered also as an application to identify the pieces of sync data S3 and SA in the linking area, however, by merely adopting the typical frame syncs [Example 1] or [Example 2], there will be relatively many cases in which the pieces of sync data S3 and SA cannot be identified.

That is to say, the sync patterns FS0 to FS6 of the frame sync are assigned to the 31 frames in a determined order so that any specific one of the frames can be identified from a combination including the sync pattern appended to the specific frame and the sync pattern appended to any one of the 4 frames preceding the specific frame. In other words, the sync patterns FS0 to FS6 of the frame sync are assigned to the frame numbers of 0 to 30 in such an order that such a combination of sync patterns appended to the frames is never duplicated throughout all the frame numbers.

If the above rule is applied to the use of any of the sync patterns as the pieces of sync data S3 and SA, however, a combination of sync patterns may be duplicated, making it impossible to identify a frame in some cases.

In order to solve this problem, if the pieces of sync data S3 and SA are also used as sync patterns for identifying a frame, a new sync pattern FS7 is used as the sync data SA as is the case with the typical frame syncs [Example 3].

<Typical Frame Syncs of ROM Disks>

EXAMPLE 4

Typical frame syncs [Example 4] are shown in FIGS. 9A and 9B. As shown in FIG. 9A, in the typical frame syncs [Example 4], a 10T pattern is used as the sync body of the frame sync FS.

Except for the use of a 10T pattern as the sync body, the typical frame syncs [Example 4] are the same as the typical frame syncs [Example 3]. To be more specific, sync patterns FS0 to FS7 are used as FS (frame sync) types and associated with frame numbers of 0 to 30 while the sync patterns FS0 and FS7 are used as the sync data S3 and the sync data SA respectively in a way similar to the typical frame syncs [Example 3].

The use of the 10T pattern is advantageous to timing detection for the spindle PLL as explained earlier in the description of the typical frame syncs [Example 2].

<Typical Frame Syncs of ROM Disks>

EXAMPLE 5

Typical frame syncs [Example 5] are shown in FIGS. 10A and 10B. As sync patterns of the frame sync FS, the typical frame syncs [Example 5] include sync patterns FS7 and FS8 in addition to the sync patterns FS0 to FS6 used in the RAM disk.

To be more specific, as ones of sync patterns distinguished from each other by using sync IDs, sync patterns FS7 and FS8 are provided in addition to the sync patterns FS0 to FS6 for the frame sync FS as shown in FIG. 10A. It is to be noted that the sync body is a 9T pattern.

As shown in FIG. 10B, the sync patterns FS0 to FS6 are assigned to frame numbers of 0 to 30 in a way similar to the RAM disk.

However, the frame number of 30 in each physical sector is associated with the sync pattern FS2 except for the last frame number of 30 in the sixteenth physical sector of the RUB. That is to say, for only frame 495, the sync pattern FS7 is appended to the last frame (frame 495) of the RUB to replace the sync pattern FS2.

In addition, the sync patterns FS8 and FS7 are used as respectively the pieces of sync data S3 and SA, which are included in the linking area.

Since the new sync pattern FS7 is used as the sync data SA as is the case with the typical frame syncs [Example 3] and [Example 4], a combination of sync patterns is never duplicated even if the pieces of sync data S3 and SA are taken into consideration so that it is possible to identify each of the RUB frames including those in the linking area.

If combinations of sync patterns described above and sync patterns appended to successive RUB frames spread over the linking area are taken into consideration, any of the combination may be duplicated so that it becomes impossible to identify a frame.

For example, consider the typical frame syncs [Example 3] shown in FIGS. 8A and 8B and the typical frame syncs [Example 4] shown in FIGS. 9A and 9B. In this case, the frame sync appended to the second frame (frame 1) of any specific RUB is the sync pattern FS1 and the frame sync appended to a frame preceding this second frame by 4 frames is the sync pattern FS2. This is because the preceding frame is the last frame (frame 495 having a frame number of 30) of a RUB immediately preceding the specific RUB.

However, the combination of the sync pattern FS1 and the sync pattern FS2 preceding the sync pattern FS1 by 4 frames also appears at a frame having a frame number of 23. This is because the frame sync appended to the frame having a frame number of 23 is the sync pattern FS1 and the frame sync appended to the frame having a frame number of 19 preceding the frame number 23 by 4 frames is the sync pattern FS2.

In order to prevent such a combination of sync patterns from being duplicated, it is necessary to append the new sync pattern FS7 only to the last frame (frame 495) of each RUB.

That is why, for only frame 495, the sync pattern FS7 is appended to the last frame (frame 495) of each RUB to replace the sync pattern FS2 in the fifth typical frame syncs as described above.

If the sync pattern FS7 is appended to the last frame (frame 495) whereas the sync patterns FS0 and FS7 are used as respectively the pieces of sync data S3 and SA as they are, however, a combination of sync patterns will be duplicated.

To be more specific, a combination of the sync pattern FS0 appended to a frame and the sync pattern FS7 appended to the immediately preceding frame is also a combination of sync patterns appended to the first frame of a linking area and frame 495 as well as a combination of sync patterns appended to the first frame (frame 0) of a RUB and the second frame of a linking area.

In order to prevent such a combination of sync patterns from being duplicated, the new sync patterns FS8 and FS7 are used as respectively the pieces of sync data S3 and SA, which are included in each linking area, in the typical frame syncs [Example 5] as shown in FIGS. 10A and 10B.

By using the typical frame syncs [Example 5] as described above, it is possible to reliably determine the frame number assigned to each of the frames including those spread over a linking area.

In the case of the ROM disk particularly, an address cannot be detected from information embedded in the wobbling groove. It is thus desirable to be capable of detecting the frame number assigned to each of frames even if the frames are spread over a RUB, that is, determining an address, with a high degree of reliability.

It is to be noted that the sync patterns FS7 and FS8 can also be appended reversely. That is to say, the sync pattern FS8 is appended to the last frame (frame 495) as well as used as the sync data SA whereas the sync pattern FS7 is used as the sync data S3.

<Typical Frame Syncs of ROM Disks>

EXAMPLE 6

Typical frame syncs [Example 6] are shown in FIGS. 11A and 11B. As shown in FIG. 11A, in the typical frame syncs [Example 6], a 10T pattern is used as the sync body of the frame sync FS.

Except for the use of a 10T pattern as the sync body, the sixth typical frame syncs are the same as the typical frame syncs [Example 5]. To be more specific, sync patterns FS0 to FS8 are used as FS (frame sync) types, the sync pattern FS7 is appended only to the last frame (frame 495) whereas the sync frames FS7 and FS8 are used as the sync data SA and the sync data S3 respectively in a way similar to the typical frame syncs [Example 5]. It is to be noted that, also in the case of the typical frame syncs [Example 6], the sync patterns FS7 and FS8 can also be appended reversely.

The use of the 10T pattern is advantageous to timing detection for the spindle PLL as explained earlier in the description of the typical frame syncs [Example 2].

5. Typical Data Format of ROM Disks ③

As the embodiments of the present invention, typical data formats of the ROM disk are shown in FIGS. 3 and 4. It is also possible to conceive a typical data format adopted by the ROM disk as a data format excluding a linking area. The typical data format including no linking area is shown in FIG. 12.

That is to say, a RUB has a configuration including 496 frames, i.e., frames 0 to 495, or the RUB has a contiguous format including no buffers.

If this typical data format ③ is adopted, the recording capacity is increased by a quantity equivalent to the excluded buffers.

In addition, since frame syncs FSes always appear regularly, the data format has merits in frame synchronization protection and the process of pull-in frame synchronization. Furthermore, the data format is also advantageous to generation of the phase error signal of the spindle PLL.

Moreover, also in the case of sync patterns used for identifying a frame, the same setting of sync patterns as the RAM disk will not result in duplication of a sync-pattern combination.

Since the size of the RUB varies from RAM disk to RAM disk, however, the typical data format ③ has a demerit in the compatibility aspect.

6. Reproduction Apparatus

The following description explains a reproduction apparatus capable of reproducing data from a ROM disk implemented by the embodiments while sustaining compatibility with the RAM disk.

It is to be noted that the RAM disk uses a 9T-pattern as a sync pattern as shown in FIGS. 5A and 5B while the ROM disk uses a 10T-pattern as a sync pattern as shown in FIGS. 7A and 7B, FIGS. 9A and 9B as well as FIGS. 11A and 11B.

FIG. 13 is a block diagram showing the reproduction apparatus.

The reproduction apparatus includes a pickup unit 51, a spindle motor 52, a pickup servo circuit 53, a spindle servo circuit 54, a reproduced-signal processor 55, a spindle-clock generation unit 56, a address decoder 57, a timing generator 58, a generated-data processor 59 and a controller 63. The spindle motor 52 is a component for rotating a recording medium. The spindle servo circuit 54 is a component for controlling the spindle motor 52. The pickup servo circuit 53 is a component for executing servo control of the pickup unit 51. The spindle-clock generation unit 56 is a component for extracting synchronization signals from a reproduced signal and outputting a phase error signal to a spindle PLL. The address decoder 57 is a component for extracting information such as an address for identifying a location on the disk 50 from the reproduced signal. The timing generator 58 is a component for generating a generation timing of data from the address information extracted by the address decoder 57. The generated-data processor 59 is a component for carrying processing such as demodulation, synchronization-detection and ECC-decoding processes. The controller 63 is a microcomputer including interface means for interfacing with external apparatus such as a host computer 64.

The disk 50 is a RAM or ROM disk that has a data format described earlier.

The disk 50 is mounted on a turntable not shown in the figure. At a reproduction time, the spindle motor 52 drives the disk 50 into rotation at a constant line velocity (CLV).

The pickup unit 51 reads out data from the disk 50. If the disk 50 is a RAM disk, data recorded on the disk 50 as phase-change marks is read out from the disk 50. If the disk 50 is a ROM disk, on the other hand, data recorded on the disk 50 as emboss pits is read out from the disk 50.

The pickup unit 51 includes a laser diode, a photodetector, an objective lens and an optical system not shown in the figure. The laser diode is a source for generating a laser beam. The photodetector is a component for detecting the laser beam reflected by the disk 50. The objective lens is a component serving as an output end of the laser beam generated by the laser diode. The optical system is a component for radiating the laser beam to the recording face of the disk 50 by way of the objective lens and guiding the reflected laser beam.

The laser diode outputs typically the so-called blue laser having a wavelength of 405 nm. The NA produced by the optical system is 0.85.

The objective lens is held in the pickup unit 51 in such a way that the objective lens can be moved in tracking and focus directions by a two-axle mechanism. In addition, the whole pickup unit 51 can be moved in the radial direction of the disk 50 by a thread mechanism.

The photodetector detects the laser beam reflected by the disk 50, generating an electrical signal representing the light quantity of the received laser beam. The photodetector outputs the electrical signal to the reproduced-signal processor 55.

The reproduced-signal processor 55 includes a current-voltage conversion circuit and a matrix-processing/amplifier circuit, carrying out a matrix process to generate required signals. The current-voltage conversion circuit is a component for converting a current, which is output by a plurality of light-receiving devices forming the photodetector, into a voltage.

The signals generated by the reproduced-signal processor 55 include a push-pull signal and a high-frequency signal representing data reproduced from the disk 50. The generated signals also include a focus error signal and a tracking error signal, which are used in servo control.

In addition, the reproduced-signal processor 55 carries out various kinds of processing on the high-frequency signal representing the reproduced data to generate reproduced channel data. The pieces of processing include an auto gain control (AGC) process, an AD conversion process, a wave equalization process and Viterbi-decoding process.

A reproduced-data signal (or a reproduced channel signal) output by the reproduced-signal processor 55 is supplied to the generated-data processor 59, the address decoder 57 and the spindle-clock generation unit 56. On the other hand, the focus error signal and the tracking error signal are supplied to the pickup servo circuit 53.

As described above, the spindle-clock generation unit 56 extracts synchronization signals from the reproduced-data signal and outputs a phase error signal to the spindle PLL. The synchronization signals are the pieces of sync data FS, SA and S3 explained earlier.

The spindle servo circuit 54 introduces the phase error signal received from the spindle-clock generation unit 56 to the spindle PLL to execute PLL control on the spindle motor 52 driving the disk 50 into rotation.

In addition, the spindle servo circuit 54 generates a spindle drive signal in accordance with a spindle kick/brake control signal received from the controller 63, carrying out operations such as starting, stopping, accelerating and decelerating operations on the spindle motor 52.

The pickup servo circuit 53 generates a variety of servo drive signals such as focus, tracking and thread drive signals from the focus error signal and the tracking error signal, which are received from the reproduced-signal processor 55.

To be more specific, the pickup servo circuit 53 generates a focus drive signal and a tracking drive signal in accordance with the focus error signal and the tracking error signal respectively, supplying the focus and tracking drive signals to respectively a focus coil and a tracking coil, which are employed in the two-axle mechanism of the pickup unit 51. Thus, the pickup unit 51, the reproduced-signal processor 55, the pickup servo circuit 53 and the two-axial mechanism form a tracking servo loop and a focus servo loop.

In addition, in accordance with a track jump command received from the controller 63, the pickup servo circuit 53 turns off the tracking servo loop and carries out a track jump operation by outputting a jump drive signal.

Furthermore, the pickup servo circuit 53 generates a thread drive signal on the basis of, among others, a thread error signal received as a low-frequency component of the tracking error signal and an access execution control signal from the controller 63, driving a thread mechanism not shown in the figure. The thread mechanism is a mechanism including a main shaft for holding the pickup unit 51, a thread motor and a transfer gear. In accordance with the thread drive signal, the thread motor is driven to slide the pickup unit 51 to a destination.

The address decoder 57 detects synchronization signals, i.e., the pieces of sync data FS, SA and S3, from the reproduced-data signal and detects address information from the reproduced-data signal on the basis of the sync data, decoding the detected address information.

The timing generator 58 generates a data reproduction timing signal from the address information detected by the address decoder 57 on the basis of a control signal received from the controller 63 and outputs the reproduction timing signal to the generated-data processor 59.

For example, the timing generator 58 generates a reproduction timing signal synchronized to a reproduction clock signal and an address synchronization signal in accordance with, among others, a reproduction start address command received from the controller 63.

On the basis of the reproduction timing signal received from the timing generator 58, the generated-data processor 59 detects a sync pattern from reproduced channel data, carrying out an RLL (1, 7) PP demodulation process, an interleave process and an ECC decoding process to reproduce user data.

The reproduced user data is transmitted to the host computer 64 by way of the controller 63.

The controller 63 is connected to the host computer 64 by an interface function of the controller 63 so that the controller 63 is capable of exchanging data with the host computer 64. In addition, the controller 63 controls the whole reproduction apparatus.

For example, the controller 63 receives a read command from the host computer 64. Assume that the read command is a command making a request for a transfer of data recorded on the disk 50 to the host computer 64. In this case, first of all, the controller 63 controls a seek operation to a position specified by an address included in the read command. That is to say, the controller 63 issues a seek command to the pickup servo circuit 53. The seek command requests the pickup servo circuit 53 to drive the pickup unit 51 to make an access to a target indicated by an address specified in the seek command.

Thereafter, necessary operation control is executed to transfer data from a specified data segment to the host computer 64. That is to say, the data is read out from the disk 50 and then decoded in the reproduced-signal processor 55 as well as the reproduced-data processor 59 to produce the requested data and output the produced data to the host computer 64.

By the way, the RAM disk uses a 9T pattern as the sync pattern while the ROM disk implemented by the embodiment uses a 10T pattern as the sync pattern as described above. Thus, a processing system involved in sync detection and/or frame synchronization needs to switch the sync pattern from the 9T pattern to the 10T pattern or vice versa.

The sync detection process is carried out in the generated-data processor 59, the spindle-clock generation unit 56 and the address decoder 57. It is to be noted that the generated-data processor 59, the spindle-clock generation unit 56 and the address decoder 57 may each be provided with a sync detection circuit for detecting sync patterns included in the reproduced-data signal. As an alternative, only one of the generated-data processor 59, the spindle-clock generation unit 56 and the address decoder 57 is provided with such a sync detection circuit, and a result of the sync detection is supplied to the other components that do not include the sync detection circuit.

In either case, the controller 63 executes control to switch the sync detection method adopted by the sync detection circuit from detection of 9T patterns to detection of 10T patterns or vice versa in dependence on whether the disk 50 from which data is to be reproduced is the RAM or ROM disk.

Figure 14:
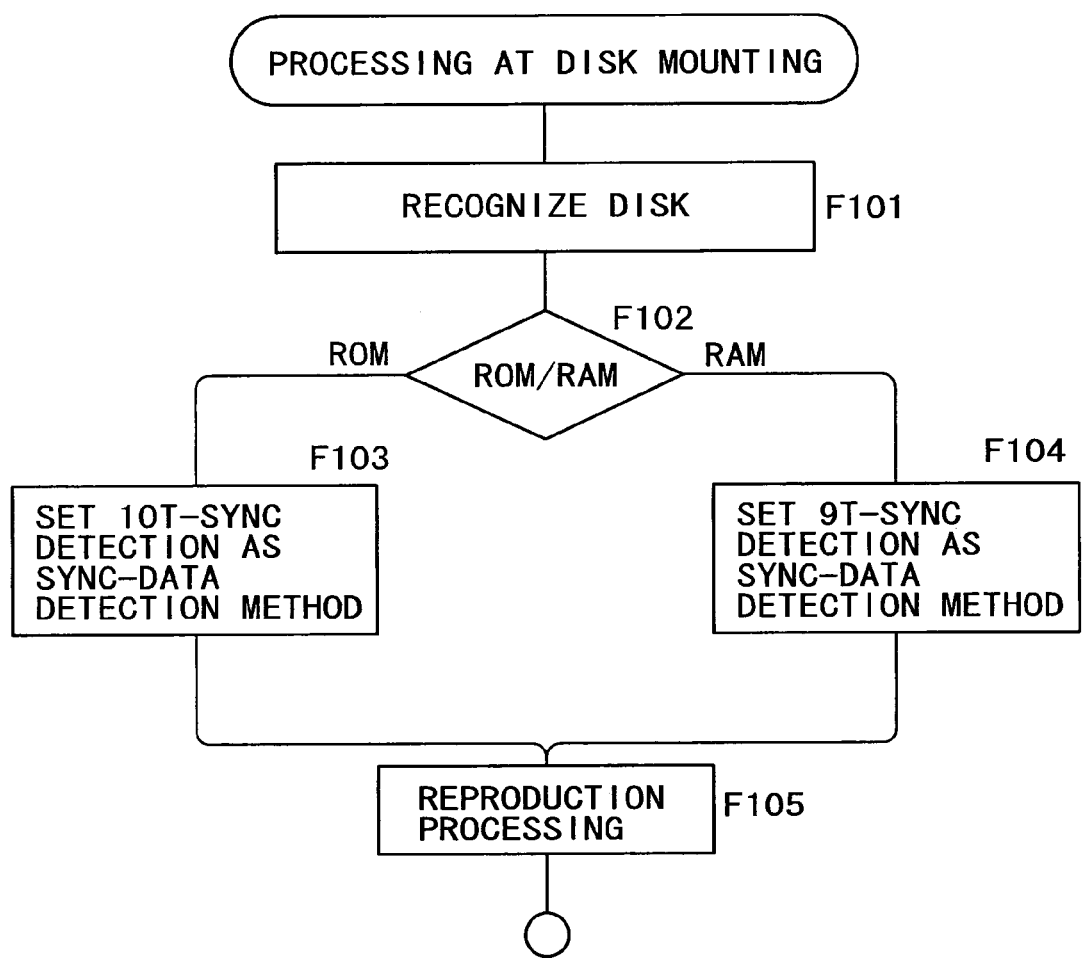
FIG. 14 shows a flowchart representing a process, which is carried out by the reproduction apparatus when a disk is mounted on the apparatus.

That is to say, at the first step F101 of a flowchart shown in FIG. 14, the controller 63 carries out a process to determine the type of the disk 50 when the disk 50 is mounted on the reproduction apparatus. Typically, the controller 63 determines whether the disk 50 mounted on the reproduction apparatus is the RAM or ROM disk by adoption of a technique, which is used as a method for detecting reflectivity or fetching disk type data from management information read out from the disk 50 when the disk 50 is mounted on the reproduction apparatus.

If the disk 50 mounted on the reproduction apparatus is found out to be a ROM disk, the flow of the reproduction processing goes on from a step F102 to a step F103 at which a method for detecting 10T patterns is adopted as the sync-data detection method.

If the disk 50 mounted on the reproduction apparatus is found out to be a RAM disk, on the other hand, the flow of the reproduction processing goes on from a step F102 to a step F104 at which a method for detecting 9T patterns is adopted as the sync-data detection method.

Then, the flow of the reproduction processing goes on to a step F105.

By switching the sync detection method as described above, the reproduction apparatus is capable of reproducing data from both the RAM and ROM disks.

It is to be noted that, as explained in the descriptions of the typical data formats of the ROM disk ① and ②, for example, a buffer is formed at the front end of each RUB and another buffer is formed at the rear end of the RUB to form a segment with a size of two frames as a linking area occupied by a run-out and a run-in even in the case of the ROM disk. Thus, the frame-synchronization process and the process to decode frame data can be carried out by a circuit system common to the RAM and ROM disks.

The descriptions given so far have explained the ROM disk and the reproduction apparatus, which are implemented by embodiments of the present invention. However, the present invention is not limited to the embodiments described above. That is to say, a variety of modified versions is conceivable.

As a typical data format of the ROM disk, it is sufficient to provide an implementation in which, at least, linking areas (or buffers) are provided in the same way as the RAM disk, and pieces of sync data are obtained regularly at frame intervals between frames.

In addition, while the reproduction apparatus is connected to the host computer 64 as shown in FIG. 13, the reproduction apparatus can be connected to another apparatus such as an AV apparatus. In addition, it is also possible to provide an implementation in which the reproduction apparatus is not connected to any apparatus. In this case, the reproduction apparatus is provided with an operation unit and a display unit to give interface members for inputting and outputting data as members with a configuration different from that shown in FIG. 13. That is to say, data is recorded and reproduced onto and from the disk 50 in accordance with operations carried out by the user and, a terminal or a speaker and a monitor are provided as the members for inputting and outputting various kinds of information.

In addition, while the embodiment implements a reproduction apparatus, it is also possible to implement a recording/reproduction apparatus capable of recording data onto the RAM disk as well.

INDUSTRIAL APPLICABILITY

As is understood from the explanations described above, in the data format of a read-only recording medium provided by the present invention, a data run-in and a data run-out are provided as buffer areas at respectively the front and rear ends of a block, which is a RUB used as a unit of recording and reproduction of data onto and from the recording medium. That is to say, linking areas required by a recording/reproduction medium (or a RAM disk) are formed on the read-only recording medium (or the ROM disk). Thus, the read-only recording medium adopts a data-arranging method identical with that the recording/reproduction medium to give an effect of excellent compatibility with the recording/reproduction medium.

That is to say, the reproduction apparatus is capable of reproducing data from both the read-only recording medium and the recording/reproduction medium by using a decode processing system common to the read-only recording medium and the recording/reproduction medium. This means that, by adding a small cost to a recording/reproduction apparatus designed for the RAM disk, for example, it is possible to provide an apparatus capable of reproducing data from the read-only recording medium (or the ROM disk).

Provided with a linking area serving as a buffer, the read-only recording medium of the present invention has excellent random accessibility. Therefore, as the so-called read-only media used as AV (Audio-Visual) storage means or a computer storage means, the read-only recording medium provided by the present invention is capable of displaying superior performance.

In addition, in each data area included in the read-only recording medium provided by the present invention as an area allocated to a data run-in and a data run-out, pieces of sync data are recorded at locations separated from each other by a distance equal in length to a sync-data gap between two consecutive frames. Thus, the sync data always appears at equal intervals in the reproduced signal. As a result, the read-only recording medium provided by the present invention is advantageous to establishment of synchronization and protection of synchronization. In addition, the read-only recording medium provided by the present invention increases the operating performance of the reproduction apparatus.

Furthermore, if pieces of sync data in the buffer area are recorded only at locations separated from each other by a distance equal in length to a sync-data gap between two consecutive frames, the read-only recording medium provided by the present invention is also advantageous to prevention of a sync pattern from being recognized incorrectly as well as optimum for the performance to bring over synchronization and various kinds of processes including a process to generate the spindle phase error signal.

Moreover, the data pattern of at least one piece of sync data recorded in the buffer area is different from the data patterns of sync data provided in the sequence of frames. Thus, the read-only recording medium provided by the present invention is optimum for prevention of a frame address from being detected incorrectly.

In addition, if a data pattern with a first inversion gap is used as sync data for the recording/reproduction medium (the RAM disk), a data pattern with a second inversion gap is used as sync data for the read-only recording medium provided by the present invention. Thus, the read-only recording medium provided by the present invention is optimum for prevention of incorrect detection of sync data used in a process such as the processing to generate the spindle phase error signal on the basis of the detected sync data in an asynchronous state.

In accordance with the reproduction apparatus provided by the present invention and a reproduction method for the apparatus, it is possible to cope even with a case in which there is a difference in inversion gap between the sync pattern of the read-only recording medium and the sync pattern of the recording/reproduction medium. Furthermore, control is executed to switch the process of detecting sync data so as to keep up with both the read-only recording medium and the recording/reproduction medium for which a data pattern with a first inversion gap and a data pattern with a second inversion gap are respectively used as the sync data. As a result, a proper reproduction process can be carried out by using a data-decoding system and an address-decoding system, which are common to the read-only recording medium and the recording/reproduction medium.

The invention claimed is:

1. A read-only recording medium for recording read-only data as a sequence of blocks each used as an information recording/reproduction unit wherein:
   each of said blocks has a data run-in serving as a front-end buffer area, a cluster comprising a plurality of successive frames each including sync data besides main data and a data run-out serving as a rear-end buffer area; and
   said blocks are recorded on said read-only recording medium in a data format including at least pieces of sync data recorded at locations separated from each other in said front-end and rear-end buffer areas, which are allocated to respectively said data run-in and said data run-out on a boundary between any consecutive two of said blocks, by a distance equal in length to a sync-data gap in said successive frames.

2. A read-only recording medium according to claim 1, wherein, in said buffer areas, said pieces of sync data are recorded only at said locations separated from each other by a distance equal in length to said sync-data gap in said successive frames.

3. A read-only recording medium according to claim 1, wherein a data pattern of at least one of said pieces of sync data in said buffer areas is different from a data pattern of sync data provided among said successive frames.

4. A read-only recording medium according to claim 1, wherein a data pattern of a second inversion gap is used as sync data recorded among said successive frames and in said buffer areas in contrast to a data pattern of a first inversion gap, which is used as sync data recorded in a recording/reproduction medium allowing data to be recorded thereon and allowing data already recorded thereon to be reproduced, wherein, much like said read-only recording medium:
   said data is recorded on said recording/reproduction medium as a sequence of blocks each used as an information recording/reproduction unit; and
   each of said blocks has a data format including a data run-in serving as a front-end buffer area, a cluster comprising a plurality of successive frames each including sync data besides main data and a data run-out serving as a rear-end buffer area.

5. A reproduction apparatus for reproducing data corresponding to both:
   a recording/reproduction medium allowing data to be recorded thereon and allowing data already recorded thereon to be reproduced wherein:
      said data is recorded on said recording/reproduction medium as a sequence of blocks each used as an information recording/reproduction unit;
      each of said blocks has a data format including a data run-in serving as a front-end buffer area, a cluster comprising a plurality of successive frames each including sync data besides main data and a data run-out serving as a rear-end buffer area; and
      a data pattern of a first inversion gap is used as said sync data; and a read-only recording medium for recording read-only data as a sequence of blocks each used as an information recording/reproduction unit wherein:
      each of said blocks has a data run-in serving as a front-end buffer area, a cluster comprising a plurality of successive frames each including sync data besides main data and a data run-out serving as a rear-end buffer area;
      said blocks are recorded on said read-only recording medium in a data format including at least pieces of sync data recorded at locations separated from each other in said front-end and rear-end buffer areas, which are allocated to respectively said data run-in and said data run-out on a boundary between any consecutive two of said blocks, by a distance equal in length to a sync-data gap in said successive frames; and
      a data pattern of a second inversion gap is used as said sync data, said reproduction apparatus comprising:
   read means for reading out information from recording media mounted thereon;
   data-decoding means for carrying out a frame synchronization process and a data-decoding process on the basis of sync data detected from information read out by said read means from said mounted recording media;
   address-decoding means for carrying put a frame-address detection process on the basis of sync data detected from information read out by said read means from said mounted recording medium; and control means for executing control to carry out:
- a process to detect said sync data by detecting a data pattern of said second inversion gap in the case of said read-only recording medium serving as said mounted recording media; and
- a process to detect said sync data by detecting a data pattern of said first inversion gap in the case of said recording/reproduction medium serving as said mounted recording media.

6. A reproduction method adopted in a reproduction apparatus for mounting either of:
- a recording/reproduction medium allowing data to be recorded thereon and allowing data already recorded thereon to be reproduced wherein:
  - said data is recorded on said recording/reproduction medium as a sequence of blocks each used as an information recording/reproduction unit;
  - each of said blocks has a data format including a data run-in serving as a front-end buffer area, a cluster comprising a plurality of successive frames each including sync data besides main data and a data run-out serving as a rear-end buffer area; and
  - a data pattern of a first inversion gap is used as said sync data; and
- a read-only recording medium for recording read-only data as a sequence of blocks each used as an information recording/reproduction unit wherein:
  - each of said blocks has a data run-in serving as a front-end buffer area, a cluster comprising a plurality of successive frames each including sync data besides main data and a data run-out serving as a rear-end buffer area;
  - said blocks are recorded on said read-only recording medium in a data format including at least pieces of sync data recorded at locations separated from each other in said front-end and rear-end buffer areas, which are allocated to respectively said data run-in and said data run-out on a boundary between any consecutive two of said blocks, by a distance equal in length to a sync-data gap in said successive frames; and
  - a data pattern of a second inversion gap is used as said sync data, said reproduction method comprising the steps of:

determining whether recording media mounted on said reproduction apparatus is said recording/reproduction medium or said read-only recording medium;

carrying out a process to detect said sync data by detecting a data pattern of said second inversion gap if said mounted recording media is said read-only recording medium or a process to detect said sync data by detecting a data pattern of said first inversion gap if said mounted recording media is said recording/reproduction medium; and carrying out a frame synchronization process, a data-decoding process and a frame-address detection process on the basis of said detected sync data.

* * * * *

UNITED STATES PATENT AND TRADEMARK OFFICE
CERTIFICATE OF CORRECTION

| | | |
|---|---|---|
| PATENT NO. | : 7,065,030 B2 | Page 1 of 1 |
| APPLICATION NO. | : 10/494588 | |
| DATED | : June 20, 2006 | |
| INVENTOR(S) | : Ryuya Tachino et al. | |

It is certified that error appears in the above-identified patent and that said Letters Patent is hereby corrected as shown below:

Column 2, Line 17, after "DVD-ROM.", please begin a new paragraph starting with "In addition,".

Column 5, Line 8, please change "BB" to --8B--.

Column 14, Line 4, please change "data.S3" to --data S3--.

Column 24, Line 66, please change "put" to --out--.

Signed and Sealed this

Sixteenth Day of October, 2007

JON W. DUDAS
*Director of the United States Patent and Trademark Office*